US012618747B2

(12) United States Patent
Buchanan et al.

(10) Patent No.: US 12,618,747 B2
(45) Date of Patent: May 5, 2026

(54) MODULAR MOUNTING APPARATUS FOR DETERMINING VEHICLE VIBRATIONAL ANOMALIES

(71) Applicant: NVH Technology LLC, Coatesville, PA (US)

(72) Inventors: Stephen T. Buchanan, Landenberg, PA (US); Saptak Das, Downingtown, PA (US); Rishi Kumar, Downingtown, PA (US); Raj Methi, Paoli, PA (US); Thomas S. Buchanan, Landenberg, PA (US); Eric L. Canfield, Downingtown, PA (US); Robert P. Alston, Exton, PA (US); David A. Fenimore, Coatesville, PA (US)

(73) Assignee: NVH TECHNOLOGY LLC, Coatesville, PA (US)

( * ) Notice: Subject to any disclaimer, the term of this patent is extended or adjusted under 35 U.S.C. 154(b) by 0 days.

(21) Appl. No.: 19/003,830

(22) Filed: Dec. 27, 2024

(65) Prior Publication Data

US 2026/0118220 A1 Apr. 30, 2026

Related U.S. Application Data

(63) Continuation-in-part of application No. 18/608,166, filed on Mar. 18, 2024, now Pat. No. 12,181,368.

(51) Int. Cl.
*G01M 1/28* (2006.01)
*G01M 13/045* (2019.01)
(52) U.S. Cl.
CPC ................................. *G01M 13/045* (2013.01)
(58) Field of Classification Search
CPC ................................. G01M 1/28; G01M 1/225
See application file for complete search history.

(56) References Cited

U.S. PATENT DOCUMENTS

RE31,971 E    8/1985  Gold
6,067,848 A  *  5/2000  Siegfried .............. G01M 17/02
                                                                73/146

(Continued)

FOREIGN PATENT DOCUMENTS

EP          3637078 A1      4/2020

OTHER PUBLICATIONS

Product brochure for PicoDiagnostics NVH kits, Noise, Vibration and Balancing, downloaded from web page: <https://www.picoauto.com/products/noise-vibration-and-balancing/nvh-overview>, download date: Dec. 29, 2023, original posting date: unknown, 5 pages.

(Continued)

*Primary Examiner* — Alexander A Mercado
(74) *Attorney, Agent, or Firm* — Panitch Schwarze Belisario & Nadel LLP

(57) ABSTRACT

An apparatus configured to be removably attached to a vehicle includes a data collection device that is removably attachable to the vehicle. The data collection device includes an enclosure including a motion measurement sensor housed therein, and a mounting mechanism. The enclosure including the motion measurement sensor housed therein is configured to measure parameters that are used for calculating vibrational anomalies of the vehicle. The mounting mechanism is removably attached to the enclosure including the motion measurement sensor housed therein. The mounting mechanism has a proximal end and a distal end. The proximal end of the mounting mechanism has a fixative for removably attaching the mounting mechanism to the enclosure including the motion measurement sensor housed therein. The fixative is immobile with respect to the enclosure immediately upon attachment to the enclosure including the motion measurement sensor housed therein. The fixative thereby does not require further movement with (Continued)

respect to the enclosure including the motion measurement sensor housed therein immediately upon attachment to the enclosure including the motion measurement sensor housed therein. The distal end of the mounting mechanism is a vehicle mounting interface configured to allow the data collection device to be removably attached to the vehicle.

5 Claims, 28 Drawing Sheets

(56) References Cited

U.S. PATENT DOCUMENTS

| | | | |
|---|---|---|---|
| 6,278,361 B1 | 8/2001 | Magiawala et al. | |
| 6,595,053 B2 | 7/2003 | Parker | |
| 7,117,603 B1 | 10/2006 | Pellegrino | |
| 9,463,674 B1 | 10/2016 | He et al. | |
| 9,785,610 B1 | 10/2017 | Larson et al. | |
| 10,284,752 B1 | 5/2019 | Canfield et al. | |
| 10,969,292 B2 | 4/2021 | Canfield et al. | |
| 11,287,348 B2 | 3/2022 | Canfield et al. | |
| 11,480,491 B1 | 10/2022 | Canfield et al. | |
| 11,534,915 B1 | 12/2022 | Alspaugh et al. | |
| 11,731,673 B1 | 8/2023 | Buchanan et al. | |
| 11,982,586 B2 | 5/2024 | Canfield et al. | |
| 11,988,573 B1 | 5/2024 | Kumar et al. | |
| 2009/0139327 A1 | 6/2009 | Dagh et al. | |
| 2010/0288030 A1 | 11/2010 | Shin et al. | |
| 2016/0179936 A1 | 6/2016 | Mathur et al. | |
| 2017/0248488 A1 | 8/2017 | Chevrier et al. | |
| 2017/0313329 A1 | 11/2017 | Peltz | |
| 2017/0350684 A1 | 12/2017 | Maliszewski | |
| 2018/0082492 A1 | 3/2018 | Stanek et al. | |
| 2020/0348327 A1 | 11/2020 | Kulkarni et al. | |
| 2021/0063267 A1 | 3/2021 | Canfield et al. | |
| 2021/0102867 A1* | 4/2021 | Vlahakis | G01M 13/02 |
| 2021/0181063 A1 | 6/2021 | Dodani et al. | |
| 2021/0223131 A1 | 7/2021 | Canfield et al. | |
| 2021/0256782 A1 | 8/2021 | Ehlers | |
| 2021/0264700 A1 | 8/2021 | Lim et al. | |
| 2021/0278315 A1 | 9/2021 | Lim | |
| 2022/0283049 A1 | 9/2022 | Canfield et al. | |
| 2023/0256979 A1 | 8/2023 | Nesbitt et al. | |
| 2023/0417617 A1 | 12/2023 | Chalofsky et al. | |
| 2024/0025217 A1* | 1/2024 | Woodruff | G01M 17/02 |

OTHER PUBLICATIONS

International Search Report and Written Opinion issued May 5, 2025 in Application No. PCT/US2025/019550.

* cited by examiner

160

Record the data for each
individual module.

161

Analyze a data section at rest
and determine each module's
orientation relative to gravity.

162

Analyze a data section at constant
speed. Rotate each module such
that the rotated Y axis is orientated
towards the bearing center.

163

Determine the relative position
of each of the modules.

164

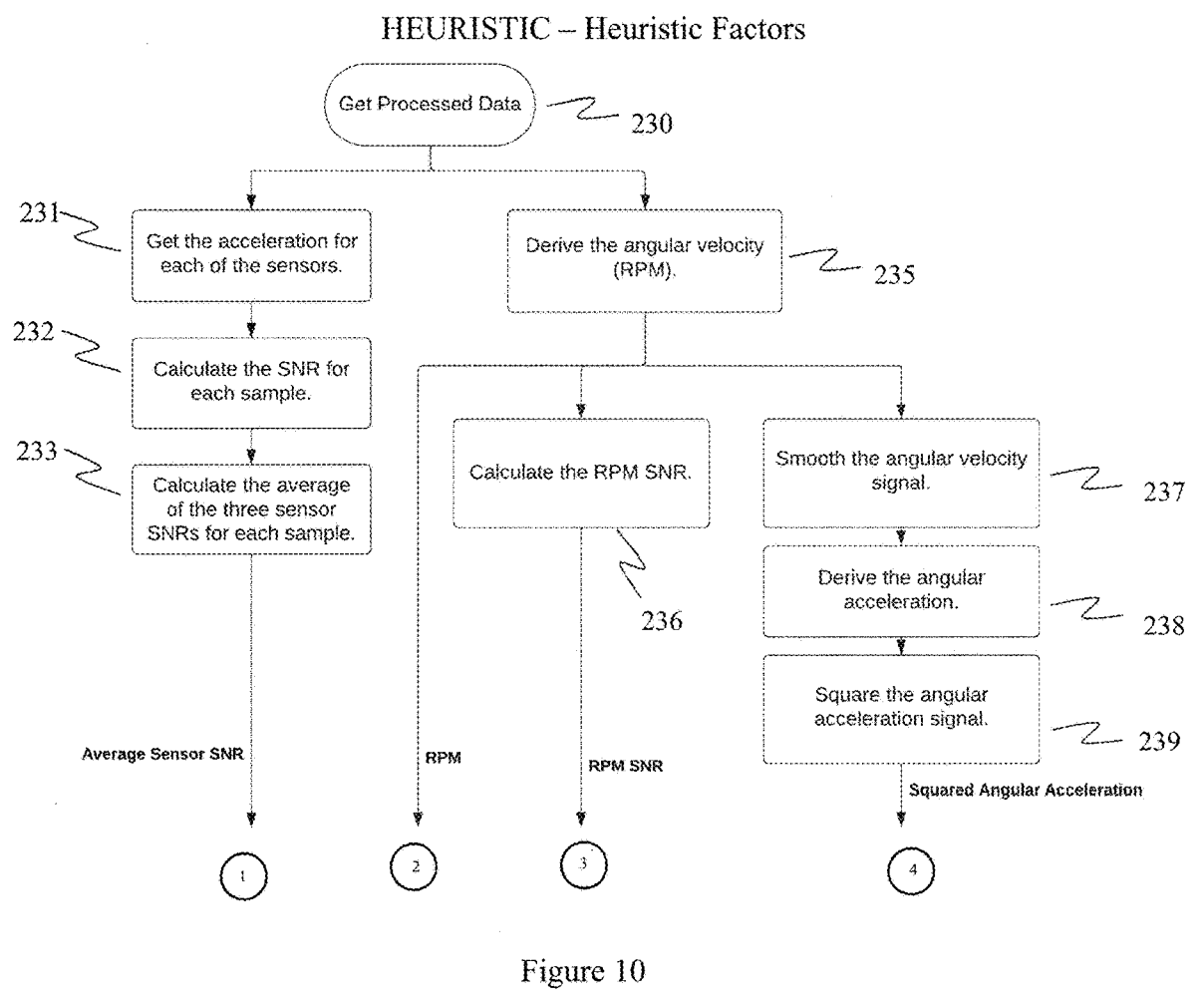

HEURISTIC – Heuristic Factors

Get Processed Data — 230

231 — Get the acceleration for each of the sensors.

235 — Derive the angular velocity (RPM).

232 — Calculate the SNR for each sample.

233 — Calculate the average of the three sensor SNRs for each sample.

Calculate the RPM SNR. — 236

Smooth the angular velocity signal. — 237

Derive the angular acceleration. — 238

Square the angular acceleration signal. — 239

Average Sensor SNR

RPM

RPM SNR

Squared Angular Acceleration 1     2     3     4

Figure 10

CALCULATION OF SNR

DERIVE ANGULAR VELOCITY

TRIANGLE METHOD

ORDER ANALYSIS/CORRECTIVE MASS DETERMINATION

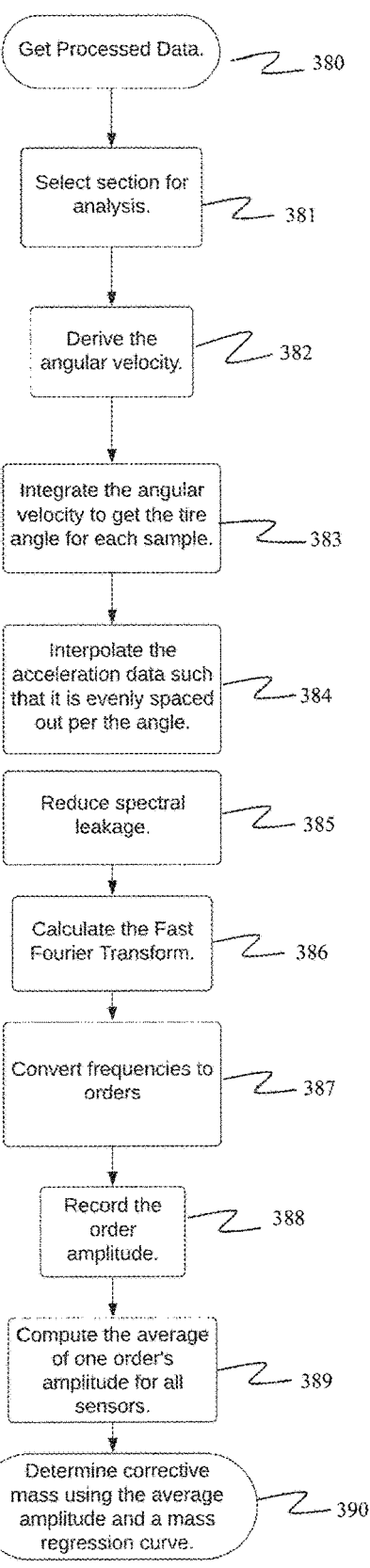

Get Processed Data. — 380

Select section for analysis. — 381

Derive the angular velocity. — 382

Integrate the angular velocity to get the tire angle for each sample. — 383

Interpolate the acceleration data such that it is evenly spaced out per the angle. — 384

Reduce spectral leakage. — 385

Calculate the Fast Fourier Transform. — 386

Convert frequencies to orders — 387

Record the order amplitude. — 388

Compute the average of one order's amplitude for all sensors. — 389

Determine corrective mass using the average amplitude and a mass regression curve. — 390

Figure 21

MODULAR MOUNTING APPARATUS FOR DETERMINING VEHICLE VIBRATIONAL ANOMALIES

CROSS-REFERENCE TO RELATED APPLICATIONS

This application is a continuation-in-part of copending U.S. Non-Provisional patent application Ser. No. 18/608,166 filed Mar. 18, 2024, which is incorporated by reference herein.

BACKGROUND OF THE INVENTION

"Vibrational anomalies of a vehicle" refers to any repetitive motion of a vehicle or component or assembly of a vehicle that could cause either a quality-of-ride issue or wear on a part of the vehicle. Vibrational anomalies can be caused by a variety of issues such as, but not limited to, engine issues, drive chain issues, chassis or wheel issues, including tire balancing issues. Some of the most commonly occurring vibrational anomalies are present in vehicle tires and wheel assemblies. "Tire balance" refers to the distribution of mass within a vehicle tire or the entire wheel assembly, including the rim, on which the vehicle tire is mounted. Tire balance may also be referred to as "tire unbalance" or "tire imbalance." As described in U.S. Pat. No. 6,595,053 (Parker), which is incorporated by reference herein, the balancing of vehicle wheel assemblies is most often accomplished by removing the tire/wheel assemblies from the vehicle and mounting each of the assemblies on an off-car-balancer. One example of an off-car balancer is The Road Force® Elite wheel balancer, which is commercially available from Hunter Engineering Company, Bridgeton, Missouri. The off-car balancer rotates the tire/wheel assembly, measures the imbalance forces, and displays the amount and location of weight to add to the wheel to bring the tire/wheel assembly into a balanced condition. Most off-car balancers spin the wheel at a relatively low and fixed speed (the equivalent of 30 mph). However, many vibrational anomalies, such as tire eccentricity, only occur at high speeds. Off-car balancers will not detect most anomalies induced by high speeds, a change in vehicle weight which changes the applied road force, or anomalies caused by other systems of the vehicle.

As also described in U.S. Pat. No. 6,595,053, a tire/wheel assembly may be balanced so that it produces negligible forces when rotated on the off-car balancer, but the same assembly may cause significant imbalance forces when mounted on the vehicle and rotated using the vehicle's bearings and axle. The imbalance forces of a tire/wheel assembly will remain constant between the off-car balancer and vehicle or truck, only if the relationship between the tire wheel assembly and the axis of rotation is the same for the two mountings. Achieving the desired on-car wheel balance with only an off-car balancer involves both accurately mounting the wheel on the balancer and then accurately mounting the tire/wheel assembly on the vehicle's hub. Along with the previously mentioned inability to detect high speed vibrational anomalies, there are additional limitations to off-car balancers.

As described in U.S. Pat. No. 6,595,053 and further described in U.S. Pat. No. 11,480,491, on-car balancers can both help eliminate the mounting accuracy problems as well as operate at the high speeds of the vehicles. Although on-car balancers are available, they are not very popular because of setup difficulties, operational limitations, and safety issues. There are two aspects of on-car balancing. First, data must be collected. Second, the data must be analyzed to determine what, if any, action needs to be taken to correct any detected imbalance forces. Another possibility with on-car balancers is the addition of other types of vehicles that are not supported by off-car balancers, such as railcars which have railcar wheels that also experience imbalance forces.

SUMMARY OF THE PRESENT INVENTION

In one preferred embodiment, the present invention provides a device configured to be removably attached to a vehicle for use in determining vibrational anomalies of the vehicle during motion of the vehicle. The device includes one or more motion measurement sensors, which in one preferred embodiment are one or more inertial measurement units (IMU's), configured to measure parameters that are used for calculating the vibrational signals during motion of the vehicles. The device includes an interchangeable module mounting interface (vehicle mounting interface) that allows the device to be attached to multiple different types of components within the vehicle. The device is interchangeably referred to herein as a "data collection device."

In one embodiment, the mounting interface is a cup-shaped module for mounting to a lug nut of a vehicle's wheel assembly. The cup-shaped module is interchangeably referred to herein as a "cup-shaped object."

The cup-shaped module is hollow along at least a portion of its length that is distal from the device. This hollow portion has a diameter that is larger than a diameter of the lug nuts of the vehicles tire/hub assembly so as to allow the device to be mounted to the vehicle's tire/hub assembly by fitting the cup-shaped module over the lug nuts of the tire/hub assembly. The cup-shaped module may include a magnet fixedly mounted at an end of the cup-shaped module that is proximate to the device so as to magnetically engage with the lug nuts and thereby inhibit the apparatus from coming off of the vehicle when the vehicle is in motion. The cup-shaped module preferably has a shape that matches the lug nut of the wheel so as to prohibit rotation of the device with respect to the lug nut of the wheel.

Another embodiment of the present invention is a method of calibrating a plurality of devices (plurality of data collection devices) placed on individual lugs of a wheel assembly such that the devices Y axis align to the bearing center of the wheel assembly. This alignment allows for the use of current methods to provide corrective action for identified anomalies. These methods utilize a plurality of motion measurement sensors (e.g., IMU's) removably attached to the wheel assembly to identify the location and magnitude of a vibrational anomaly of the wheel assembly and provide suggested corrective actions.

Another embodiment of the present invention is a mounting interface that allows the device (data collection device) to be attached to any component of the vehicle for amplified vibrational isolation of the component. In one embodiment, the method of mounting involves magnetic connection to a ferrous component, with the understanding that magnetic mounting is one of any possible removably attached methods for mounting the device to a component.

Another embodiment of the present invention is a calibration tool that is an alternative method of aligning the devices' Y axis to the center.

BRIEF DESCRIPTION OF THE DRAWINGS

Preferred embodiments of the present invention will now be described by way of example with reference to the accompanying drawings:

FIG. 10 is the first section of the Heuristic flowchart. This section shows the process followed when determining the Heuristic Factors which are Average Sensor SNR, RPM, RPM SNR, and Squared Angular Acceleration.

FIG. 21 is a flowchart of the applied order analysis process when determining the imbalance mass.

DETAILED DESCRIPTION OF THE INVENTION

Figure 1A:
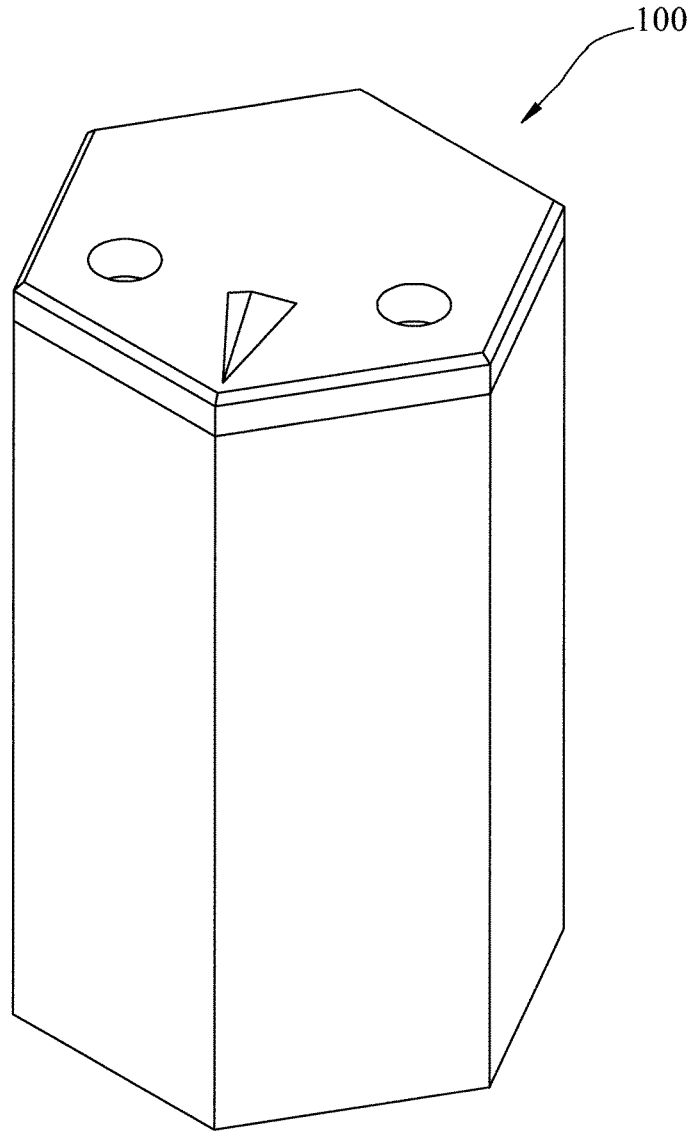
FIG. 1A shows one preferred embodiment of the present invention.

Certain terminology is used herein for convenience only and is not to be taken as a limitation on the present invention. The words "a" and "an", as used in the claims and in the corresponding portions of the specification, mean "at least one."

The discussion below builds on the discussion of "vibrations" as presented in U.S. Pat. No. 11,480,491 (Canfield et al.); U.S. Pat. No. 11,287,348 (Canfield et al.); U.S. Pat. No. 11,480,491 (Canfield et al.); and U.S. Pat. No. 11,287,348 (Canfield et al.), each of which are incorporated by reference herein, and which refer to "vibrations" and "translational vibrations." Some vibrations are the result of translational forces, whereas other vibrations are not the result of translational forces. One type of translational vibration is "imbalance forces" which can be caused by an imbalanced rotating mass. The present invention determines the presence of one or more "vibrational anomalies." In one embodiment, the vibrational anomaly or anomalies are those of a vehicle. In another embodiment, the vibrational anomaly or anomalies are specific to that of a tire/hub/wheel assembly.

U.S. Pat. No. 11,480,491, and the discussion below, also refers to a vehicle being "in operation." For a passenger vehicle or truck (e.g., a motor vehicle, an electric vehicle (EV), "in operation" includes having the vehicle in motion or having the vehicle's engine on (in the case of a motor vehicle), but not necessarily having the vehicle in motion. For other types of vehicles, such as railcars, being "in operation" requires having the vehicle in motion.

U.S. Pat. No. 11,480,491, and the various embodiments described below, each make use of either one or a plurality of Inertial Measurement Units (hereafter IMU's). Any IMU may be used that has a form factor and durability suitable for the environment described herein. One suitable IMU is the IMU described in U.S. Pat. No. 10,284,752 (Canfield et al.), which is incorporated herein by reference. Sample measured data, which are used for calculating the imbalance forces during motion of the vehicle, are captured by one or a plurality of IMU's. These data include, but are not limited to, linear acceleration and angular velocity. The scope of the present invention further includes other types of motion measurement sensors which measure the parameters that are required for the purposes described herein. For simplicity, the embodiments wherein the motion measurement sensors are IMU's are described below.

The one or a plurality of IMU's, interchangeably referred to herein also as "sensors", are arranged in a device that is removably attached to the lug nuts of a tire/wheel assembly in such a fashion as to not detach while the vehicle is in operation. U.S. Pat. No. 11,480,491 describes an embodiment wherein three IMU's are placed on a single printed circuit board (PCB) that is mounted to a platen which is then mounted to the lug nuts of a tire/wheel assembly via cup shaped devices.

A preferred embodiment of the present invention provides a single IMU housed in a device with a removably attached mounting interface, wherein different mounting mechanisms can be interchangeably attached depending on the location on the vehicle and component of focus. The device allows for remote collection of IMU data of any component of the vehicle that it is in physical contact with by means of the plurality of mounting mechanism. The device is able to perform remote collection by any method such as onboard storing of data or through the use of wireless communications such as, but not limited to, Bluetooth or RF connection. The current embodiment incorporates the use of an RF antenna but is not limited to such an embodiment.

Figure 1B:
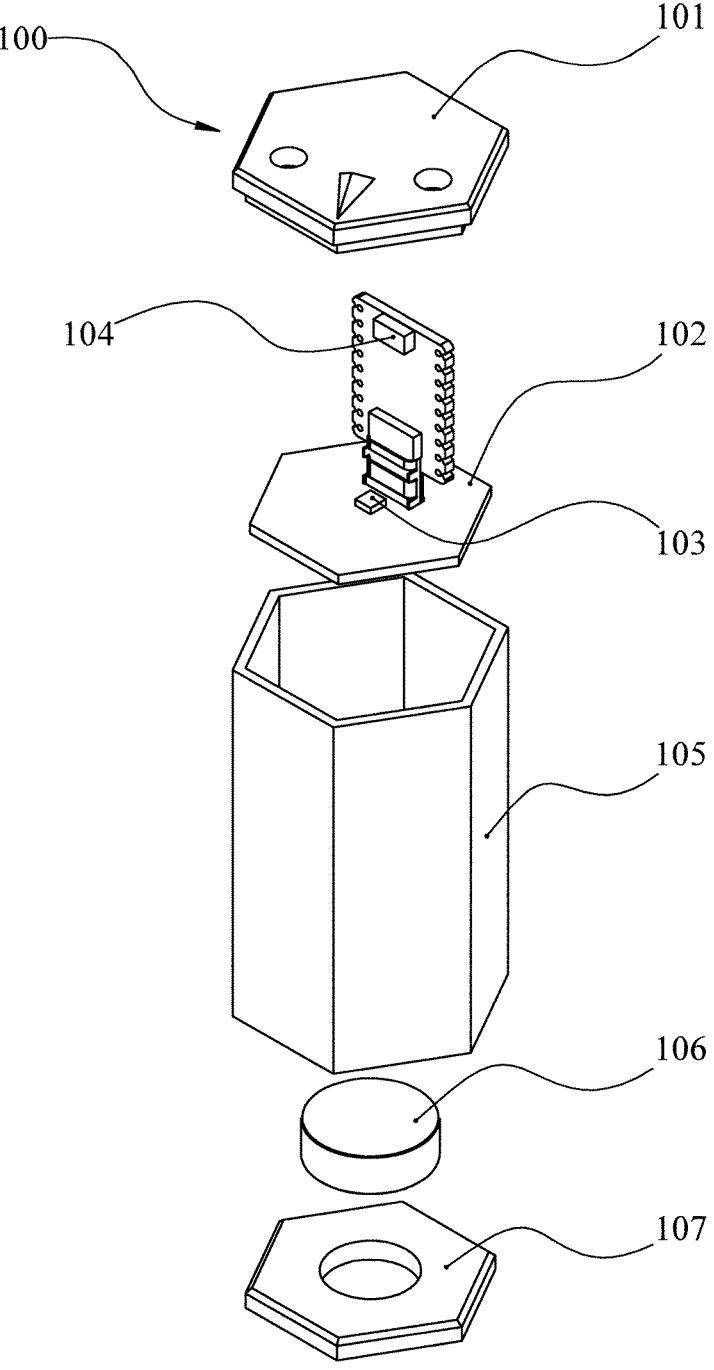
FIG. 1B shows an exploded view of the device in FIG. 1A.
Figure 2A:
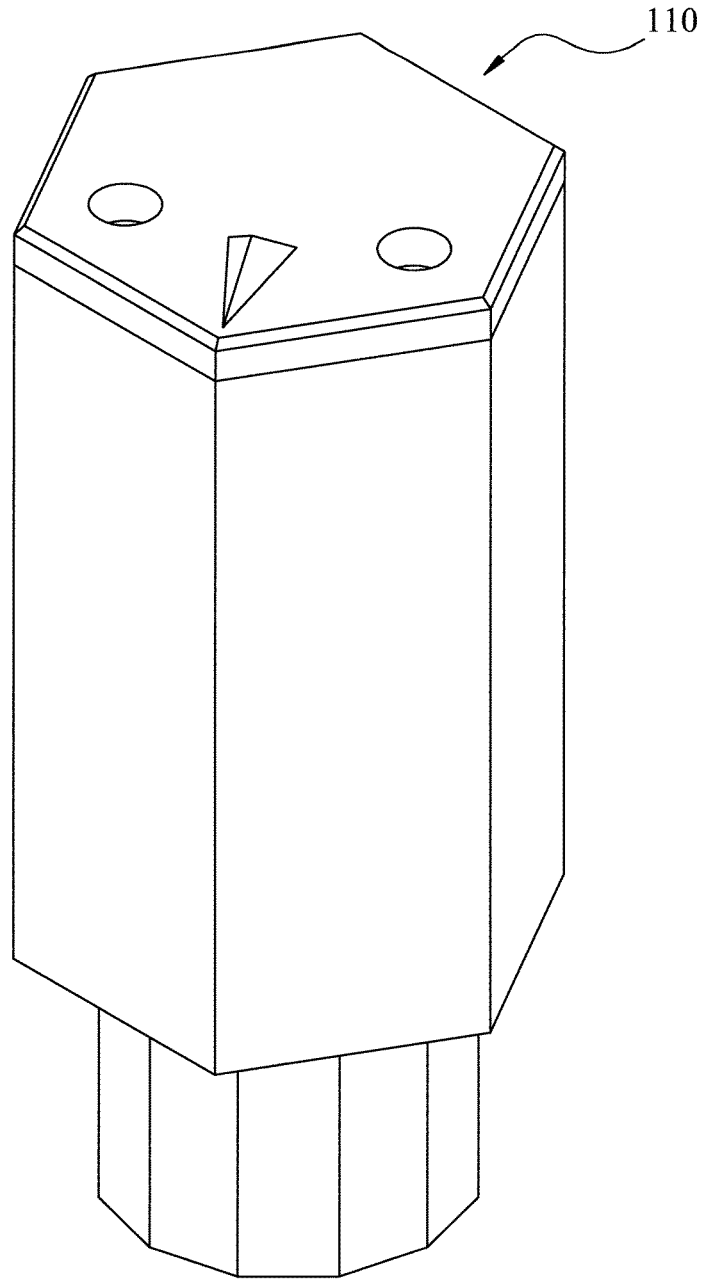
FIG. 2A shows the device in FIG. 1A with an attachable cup-shaped module.

The device (data collection device) is shown in FIG. 1A as device 100 and in FIG. 1B where the device 100 is comprised of a lid 101, and PCB 102 with at least one IMU 103 and an RF antenna 104, and an enclosure 105 which has a magnet 106 distal to the lid which is held in place by a retaining ring 107. The magnet 106 is one preferred method of interfacing the enclosure with different mounting mechanisms, thereby allowing the mounting mechanism to be removably attached to the motion measurement sensor, here, the IMU 103. More generally, the magnet 106 is a fixative and other fixatives are within the scope of the present invention. FIG. 2C is another view the device 100 that shows how the retaining ring 107 keeps the magnet 106 in place and how the mounting mechanism would fit into the device 100. In this embodiment, the retaining ring 107 has a hexagonal outer edge so as to mate within the hexagonal cavity of the enclosure 105. One such mounting mechanism is shown in FIG. 2A as cup-shaped module (cup-shaped object) assembled with the device 110 and in an exploded view in FIG. 2B. The device 110 is comprised of the device 100, the lug attachment 111, and an attachment magnet 112, which allows for the device 110 to be directly mounted onto an individual lug nut of a tire/wheel assembly.

Figure 2B:
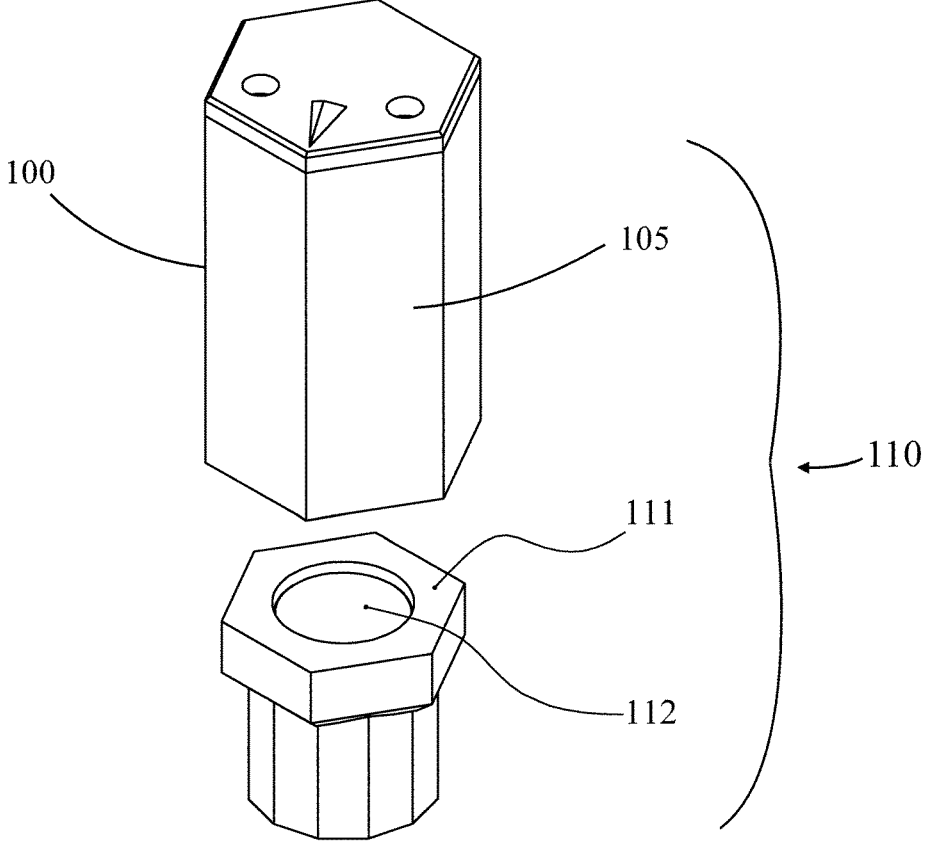
FIG. 2B shows an exploded view of FIG. 2A.
Figure 2C:
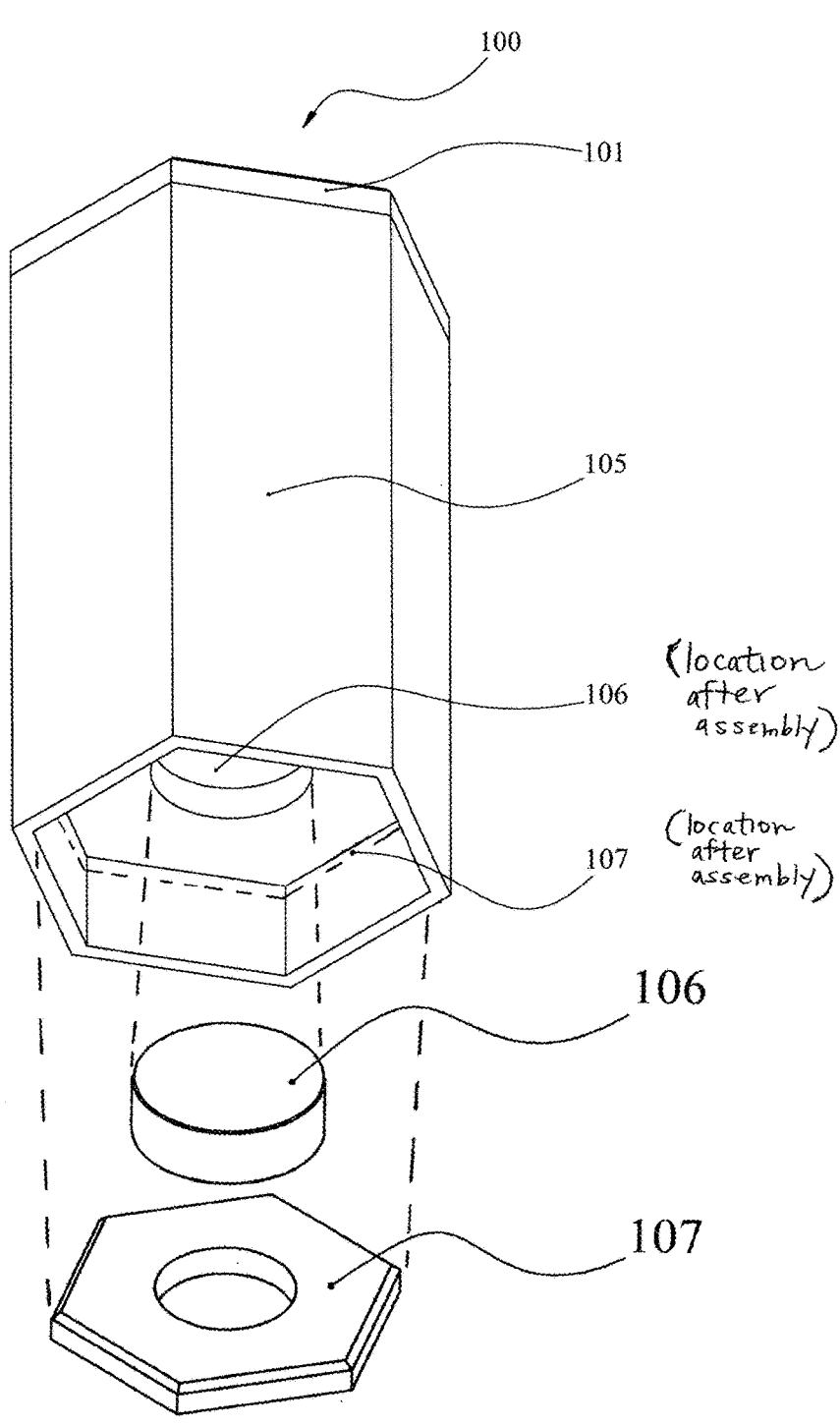
FIG. 2C shows a perspective view of the underside of the device of FIG. 1A.
Figure 2D:
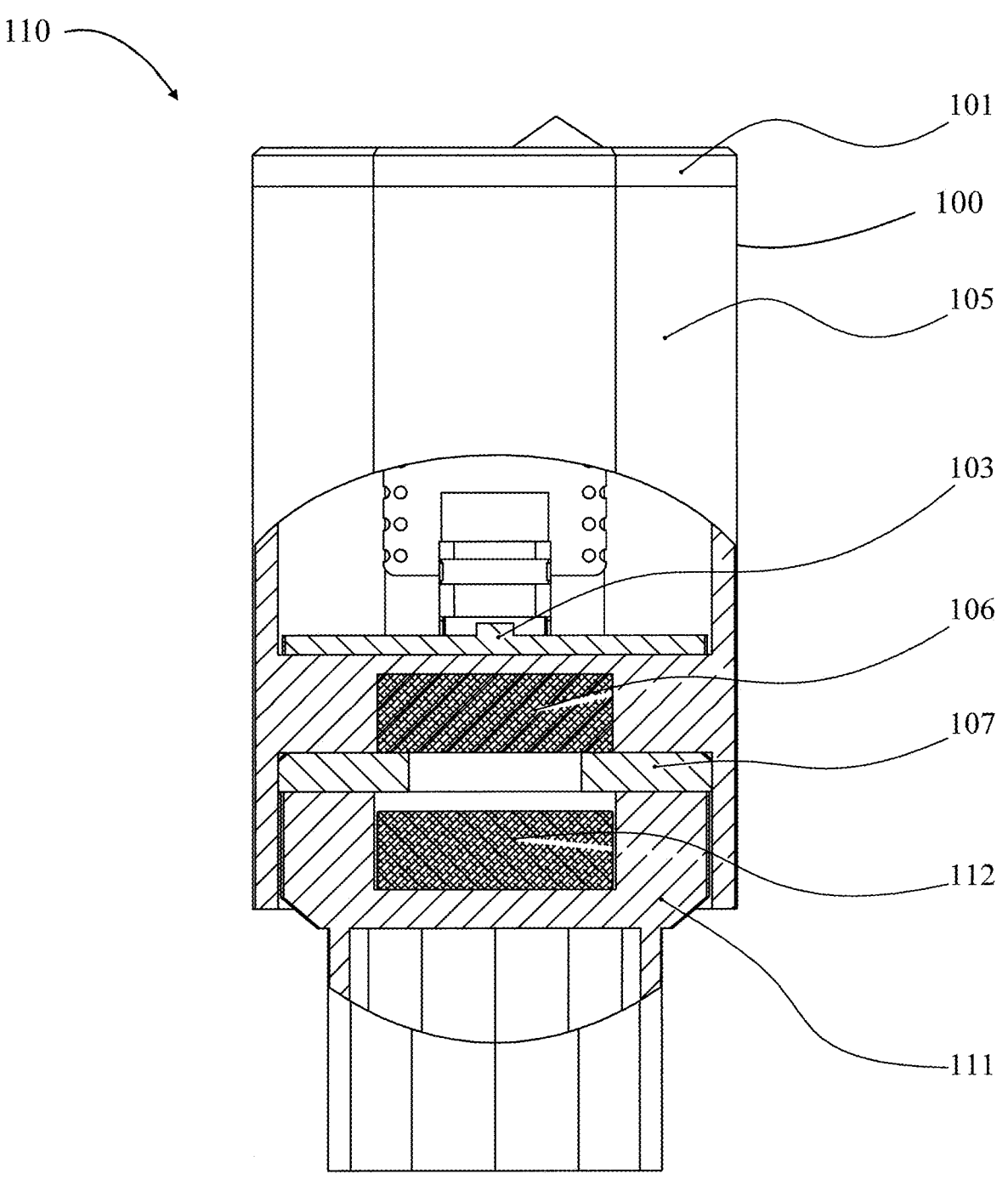
FIG. 2D shows a cross-sectional view of the device of FIG. 1A.
Figure 22:
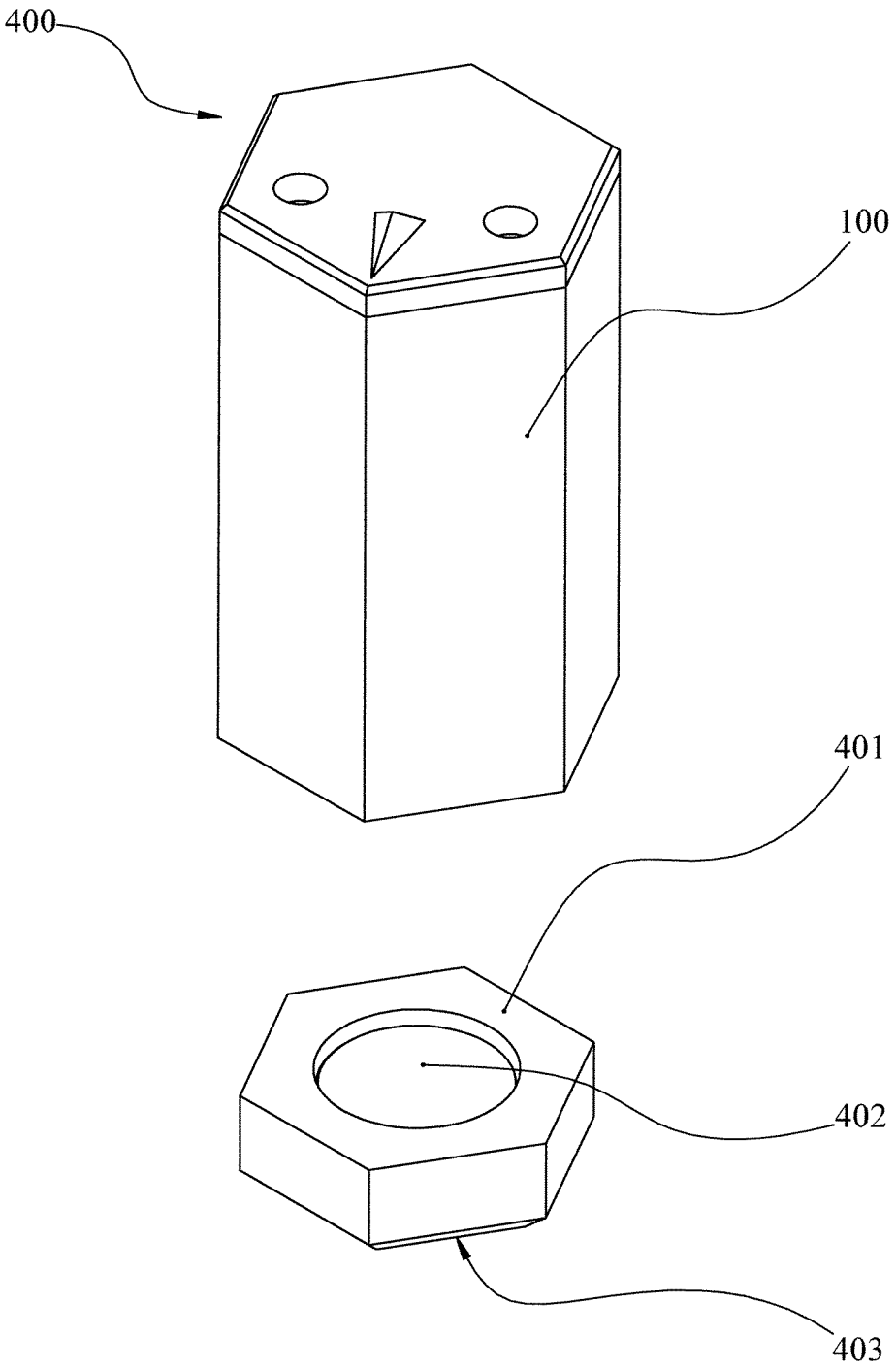
FIG. 22 shows another embodiment of the present invention with a body mounting mechanism.
Figure 23:
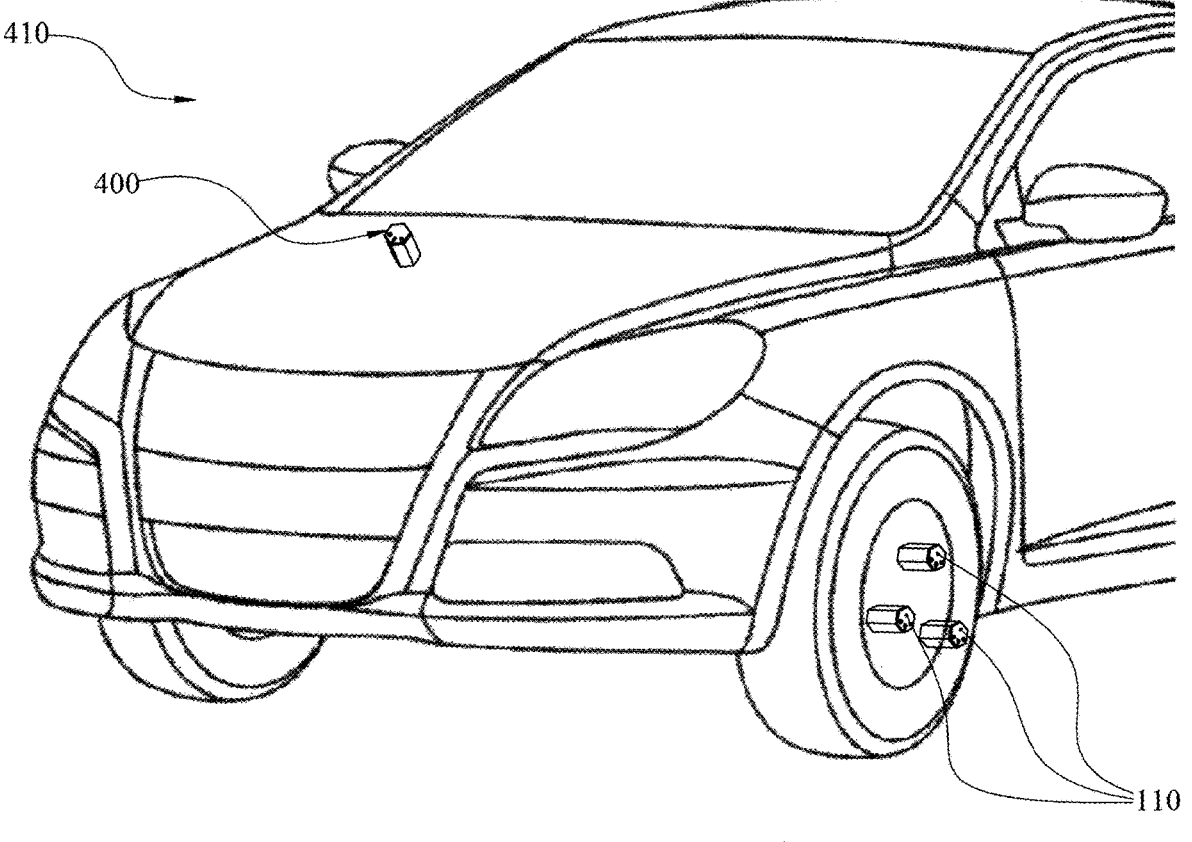
FIG. 23 shows data collection devices of the present invention mounted at multiple locations on a vehicle.

More generally, the mounting mechanism shown in FIGS. 2A and 2B has a proximal end and a distal end. The proximal end of the mounting mechanism has a fixative (e.g., magnet 112) for removably attaching the mounting mechanism to the enclosure 105 having the motion measurement sensor (e.g., IMU 103) therein. The distal end is a vehicle mounting interface configured to allow the data collection device to be removably attached to the vehicle. As discussed above, one such vehicle mounting interface is the cup-shaped module shown in FIG. 2A. Another such vehicle mounting interface is a magnet (different from the magnet 106) which allows the data collection device to be mounted onto ferrous (magnetically receptive) components of the vehicle or the vehicle body, as illustrated in FIG. 22 and FIG. 23, described below. FIG. 2D provides a section view of the fully mated device 110 and shows the device 100 with the lug attachment 111 mated thereto. The section view shows how the two magnets 106 and 112 are used to mate the mounting mechanism to the device 100.

For clarity, and as further illustrated in FIG. 2B, the device 100 houses an IMU and the device 110 refers to the assembly of the device 100 and the mounting mechanism.

Thus, in one preferred embodiment of the present invention, the fixative (e.g., magnet 112) removably attaches the mounting mechanism (lower portion of FIG. 2B) to the enclosure 105 including the motion measurement sensor (e.g., IMU 103). The fixative is immobile immediately upon attachment to the enclosure 105 including the motion measurement sensor housed therein. The fixative thereby does require further movement with respect to the enclosure 105 including the motion measurement sensor housed therein immediately upon attachment to the enclosure 105 including the motion measurement sensor housed therein.

As further explanation, FIG. 2C shows how the retaining ring 107 keeps the magnet 106 in place while being the mating face for the mounting mechanism 111 (not shown in FIG. 2C). The section view in FIG. 2D further illustrates how the retaining ring 107 fits into the device 100. FIG. 2C also shows a view of the cavity that allow the mounting mechanism 111 to mate into the device 100. Again, the fully assembled view of these elements is also shown in FIG. 2D.

Figure 3:
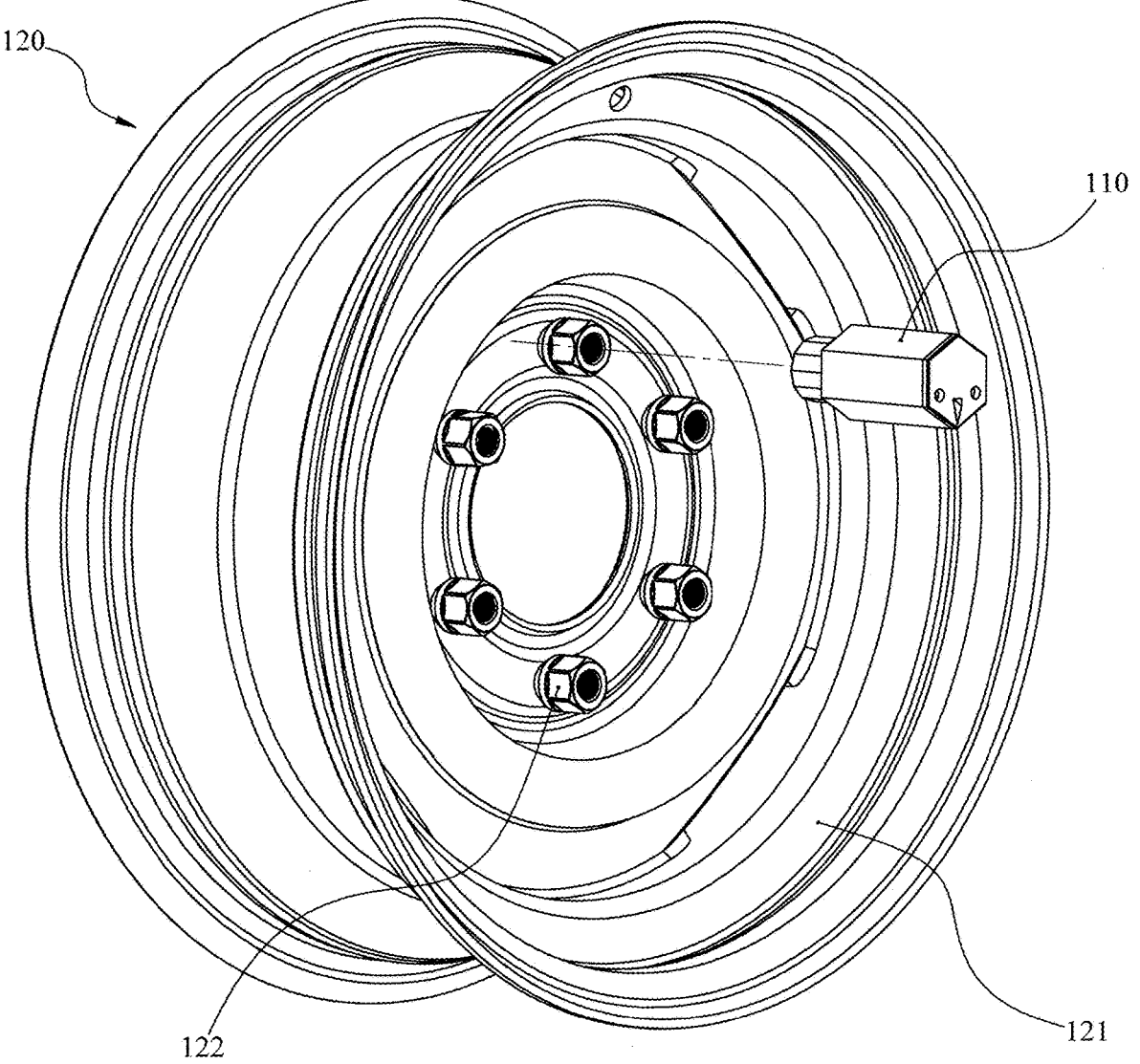
FIG. 3 shows one embodiment of the present invention with the lug attachment attached to the lug of a wheel assembly.
Figure 4:
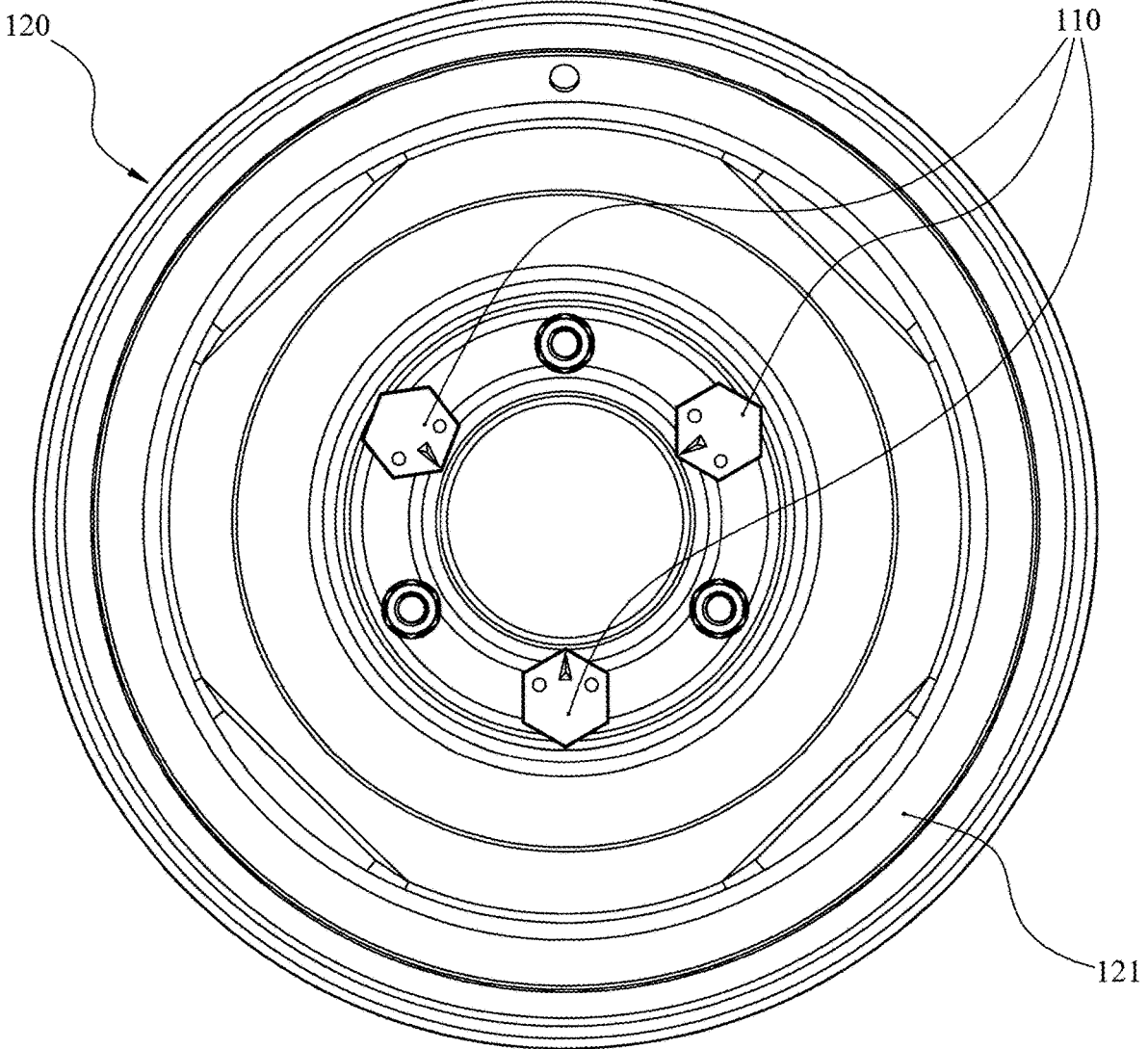
FIG. 4 shows three devices arrayed on a 6 lug tire/hub assembly.
Figure 5:
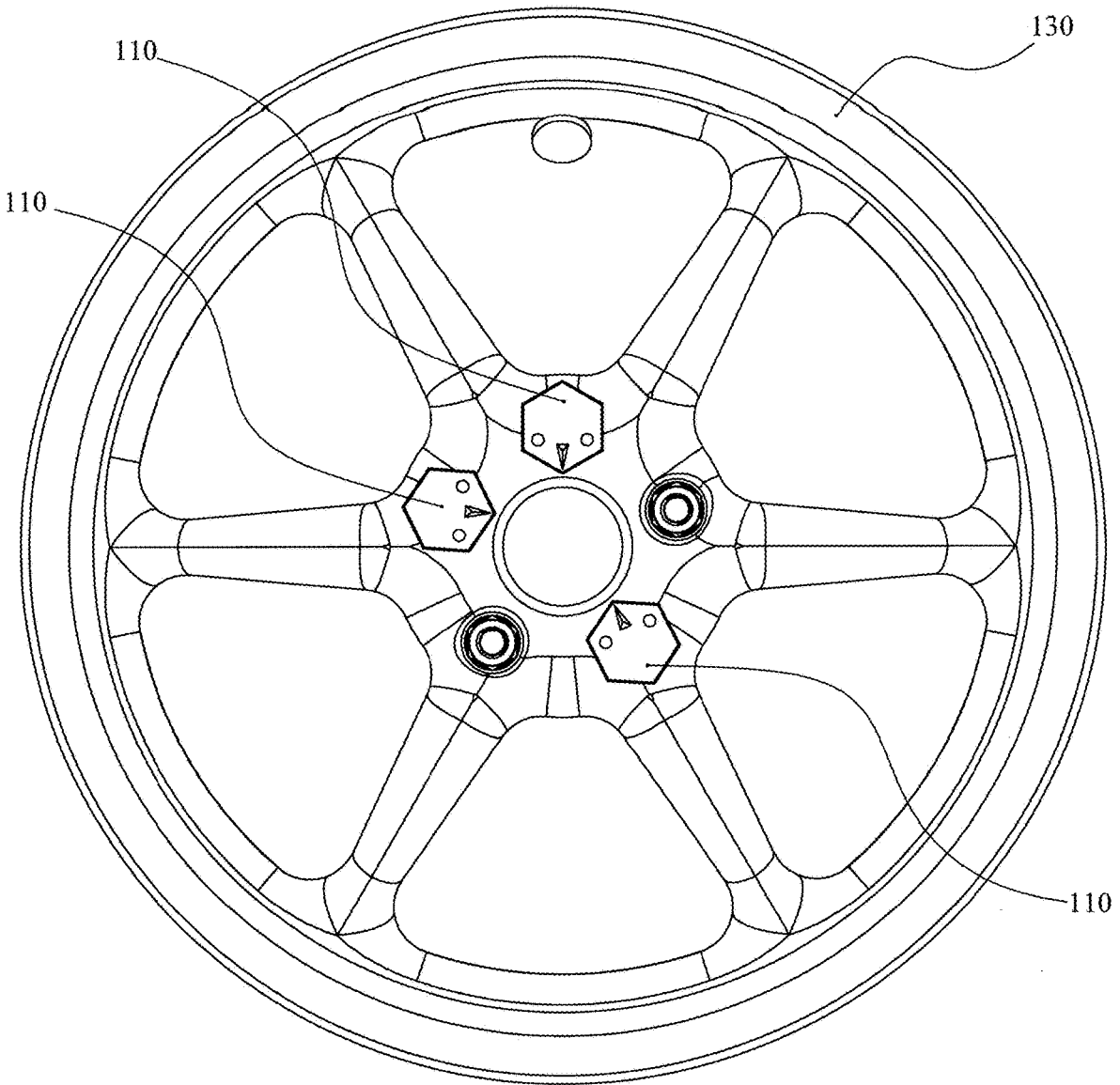
FIG. 5 shows three devices on a 5 lug hub assembly.
Figure 6:
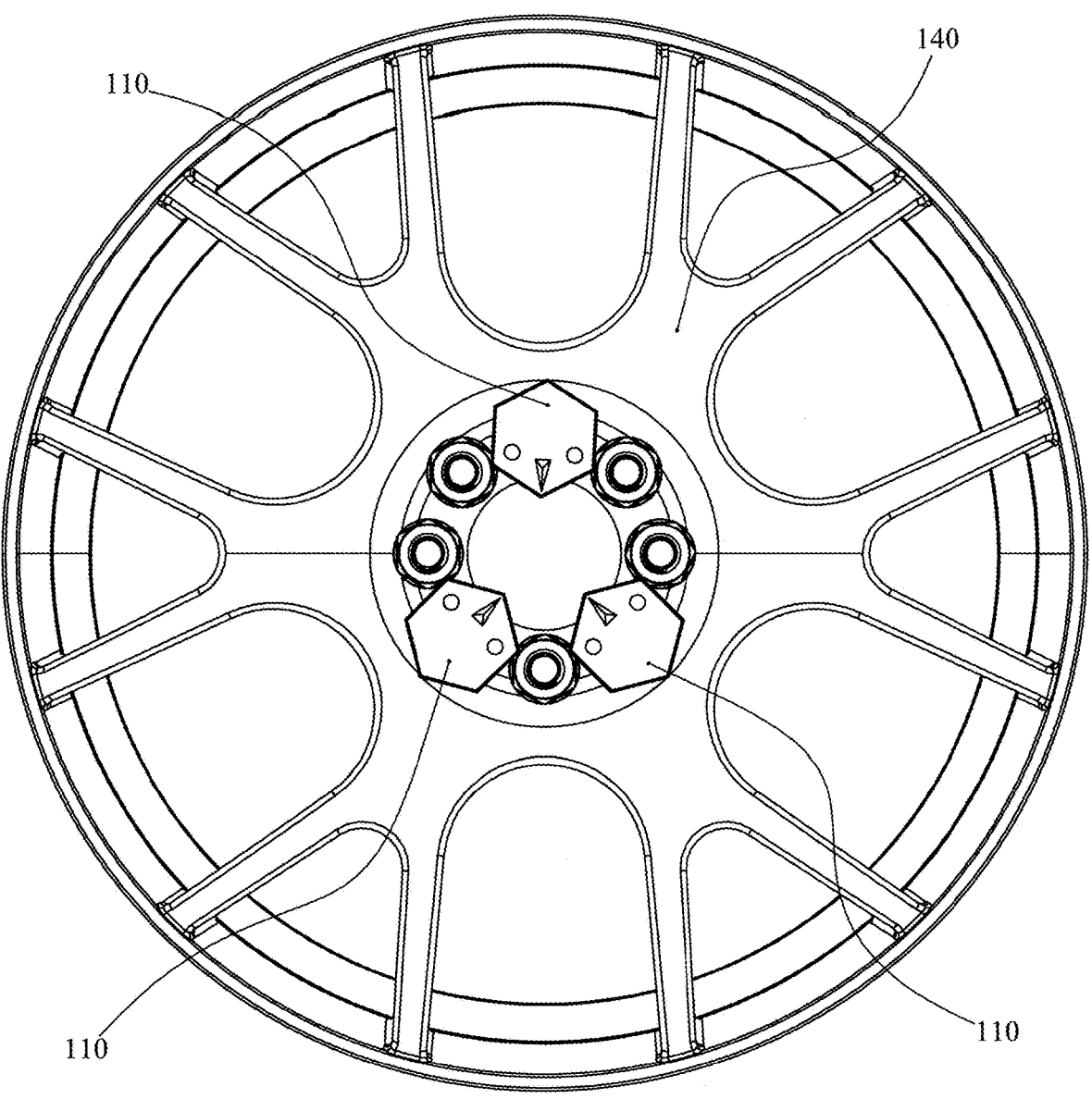
FIG. 6 shows three devices on an 8 lug hub assembly.

FIG. 3 shows an individual device with the lug nut attachment 110 attached to a 6-lug wheel assembly 120 consisting of 6-lug tire rim 121 and lugs 122. FIG. 4 shows one preferred embodiment for the use of the device on a 6-lug wheel assembly which includes three devices with the lug nut attachments 110 placed on three lugs, equally spaced apart, of a tire wheel assembly 120. The use of three devices allows for the triangulation of an imbalance using an initial calibration step and sensor triangulation methods described below. While a 6-lug rim allows for evenly spaced devices, spaced one lug apart, the triangulation works with odd-spaced lug patterns. FIG. 5 shows a 5-lug pattern, with two devices 110 needing to be placed on adjacent lugs. FIG. 6. shows an 8-lug rim 140 pattern, where there is an unequal distribution but there is at least one lug separation. All lug pattern configurations allow for the triangulation of a vibrational anomaly.

One preferred embodiment of the present invention provides an initial calibration step in which three independent IMU's, located on the lug nuts, can be calibrated such that their individual axis orientation and location can be taken into consideration. This initial calibration step allows for three individual lug devices to be determined and aligned such that methods, similar to those derived for devices with integrated PIU's such as those from U.S. Pat. No. 11,480, 491, can be used to determine the bearing center and therefore the location and magnitude of a vibrational anomaly in a tire/wheel assembly.

Figure 7:
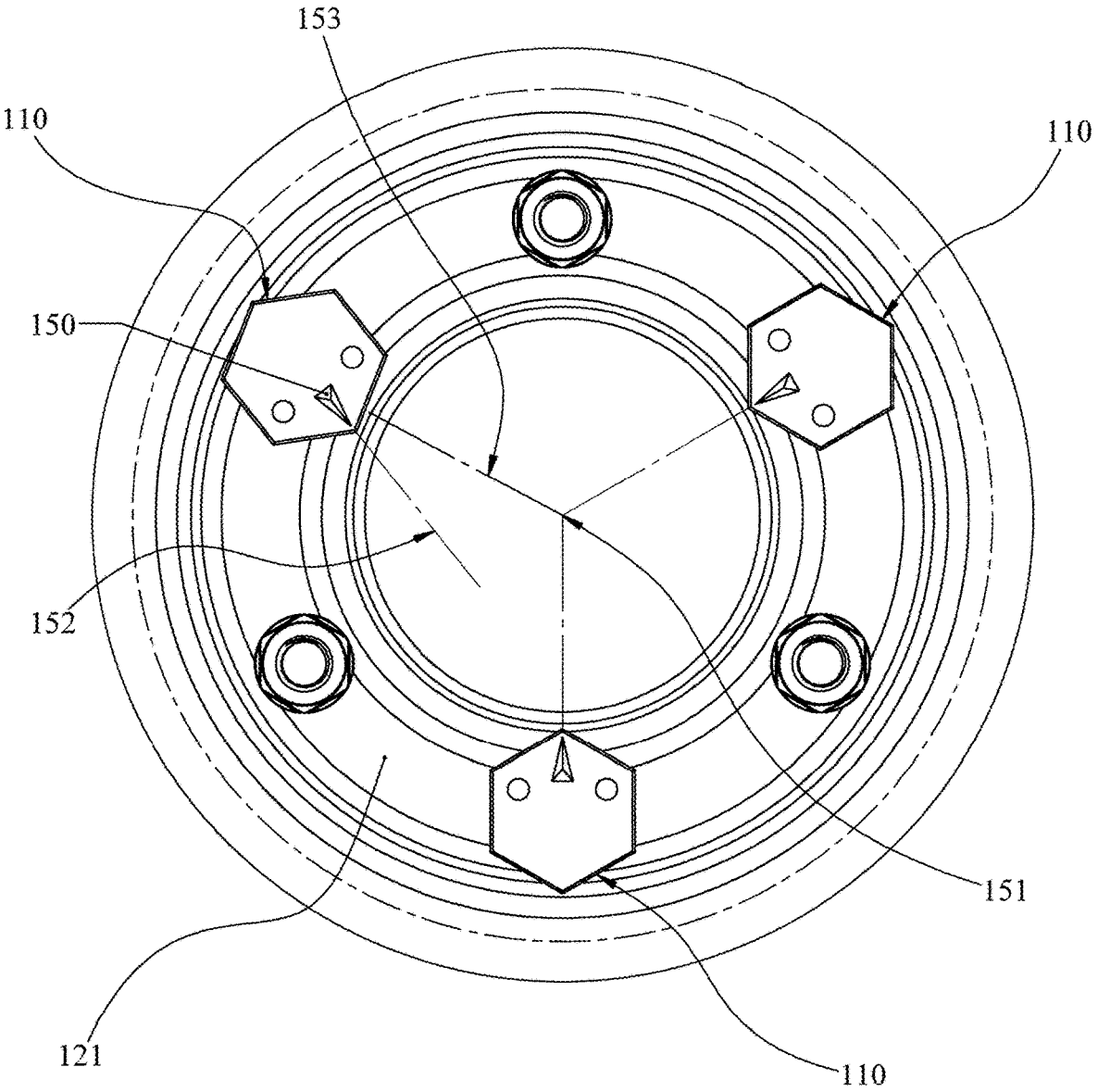
FIG. 7 shows the hardware calibration and alignment of a lug attached device.

The initial calibration includes a hardware element and a mathematical element. The hardware stage is shown in FIG. 7 which utilizes indicator 150 built into the enclosures 101 which allows for the Y-axis 152 of the IMU's to be pointed as close as possible to the center of the wheel 151. Due to the hexagonal shape lug nuts, the lug attachment 111 can only align the device 110 within a range of degrees towards the bearing center, ±30 degrees. This degree range is shortened in one embodiment by designing the lug attachment in the shape of a dodecagon, decreasing the range to +−15 degrees, but no physical method can guarantee true alignment of the device 110 to the bearing center 151. The indicator 150 can be used to align the device 110 as close as physically possible to the bearing center 151. FIG. 7 shows three devices, two aligned to the bearing center 151, and one misaligned with the devices Y axis 152 slightly off the true alignment from center 153.

Figure 8:
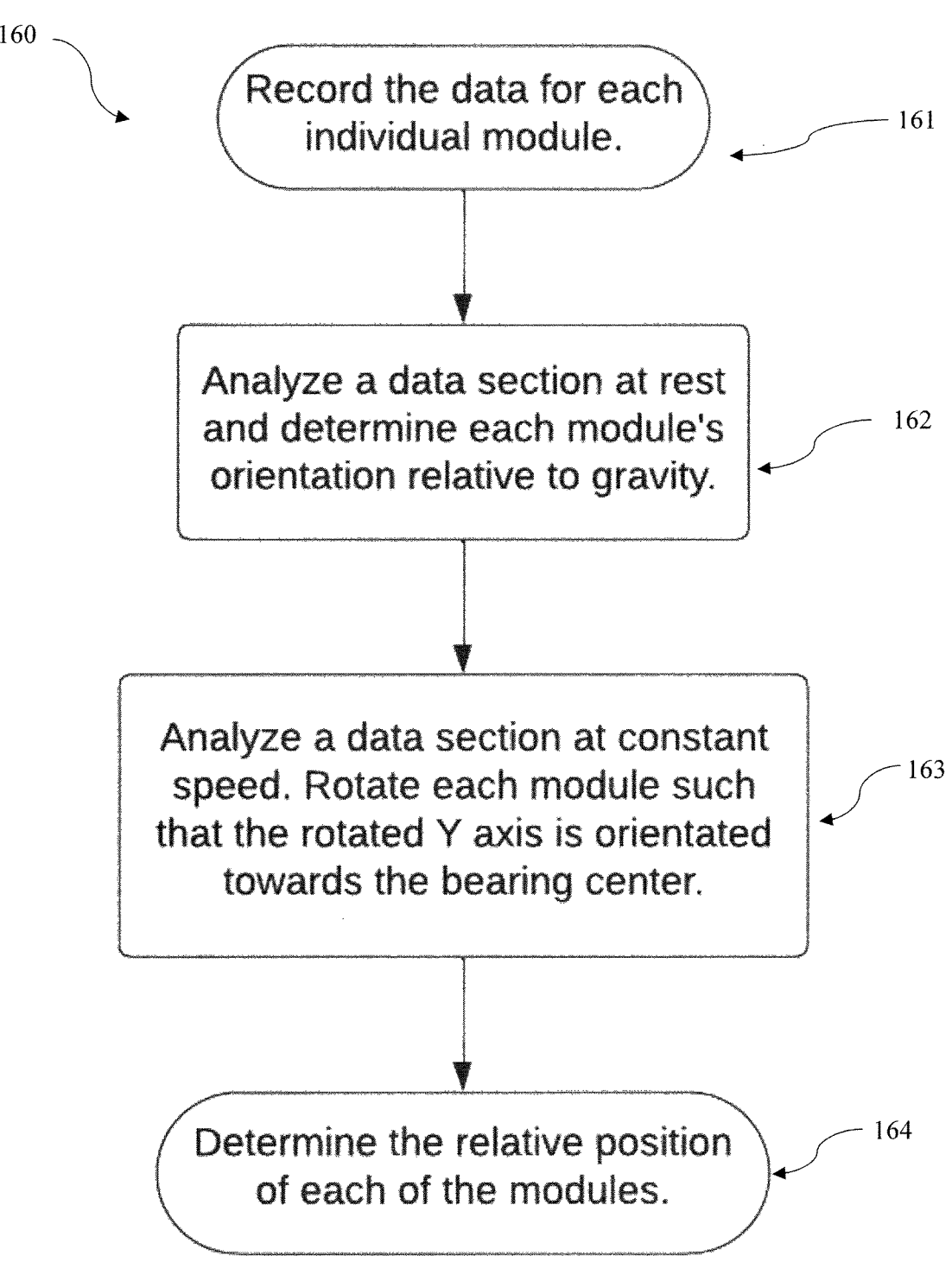
FIG. 8 shows the flowchart for mathematical calibration required to compensate for misalignment with hardware calibration.

As shown in FIG. 7 with the actual alignment 153, the indicator 150 does not guarantee the alignment of the Y-axis 152 of the device with the bearing center 151 but does allow the device to be positioned as close as possible to the bearing center 151. Accordingly, a mathematical step is needed to further align the Y-axis with the bearing center. One possible method of this mathematical alignment can be performed by a rotation of the axis. FIG. 8 shows a flowchart of one possible method of mathematical rotation 160 that uses gravitational readings to identify the device's orientation and bearing center.

Block 161 Record the data for each individual module. Record the data of each individual sensor device (module), with its Y-axis aligned with gravity so as to get each device's relative gravity reading.

Block 162 Analyze a data section at rest and determine each module's orientation relative to gravity. Once the device has been attached to the lug nut, collect data and determine its alignment relative to gravity by comparing it with the axis aligned reading 161. This will get the device's orientation relative to gravity.

Block 163 Analyze a data section at constant speed. Rotate each module such that the rotated Y axis is orientated towards the bearing center. At a constant speed, tangential acceleration is negligible. Thus, the module can be rotated such that the Y-axis represents the centripetal acceleration. This is accomplished by assuming the Y-axis sensor is reading projected centripetal acceleration of each module onto the sensor's Y-axis and the centroid of the magnitudes of all three Y-axis readings is assumed to be the center of rotation (instantaneous center of rotation). At low speeds, the vibration due to anomalies is minimal, allowing for the center of rotation (instantaneous center of rotation) to be assumed as the bearing center.

Block 164 Determine the relative position of each of the modules. By determining the phase shift between the waveforms of each module, which directly correspond to the relative angular position, the relative module position for each module can be determined. By using the relative position of each module, in combination with the knowledge of which lugs the devices are attached, the lug pattern and lug radius can further define the relative module position in relation with the wheel.

With the relative position of each module being known, the bearing center relative to a designated device can be given, thereby indicating the location of vibrational anomalies with respect to the attached device. Vibrational anomalies can be identified using similar methods as those currently being filed and restated below. Methods start with the process of collecting data for the detection of wheel-based anomalies.

One preferred embodiment of a process for collecting motion data of the wheel is described by the following Data Collection Process:

1) Locate a section of road that allows the vehicle to attain and maintain a consistent speed for a desired Data Collection Interval, such as 15 seconds, and then attain and maintain a consistent testing speed, either a Low-Speed or High-Speed test. One example of a Low-Speed and High-Speed is used in the referenced embodiment with the Low-Speed being maintained at 30 MPH and the High-Speed being maintained at 60 MPH. In preferred embodiments of the present invention, High-Speed (interchangeably referred to herein as the "second speed) is between 1.5 and 3.0 times the Low-Speed (interchangeably referred herein as the "first speed."), although other ratios are within the scope of the present invention.

2) Prepare the Measurement Device with trial parameters. These parameters include, but are not limited to, sensor sensitivity and filter specifications.

3) Affix the device or devices to the wheel lug nuts. It should be noted that the number of wheel lug-mounted devices is only limited to the number of wheels on a given vehicle.

4) Drive the vehicle to the testing site.

5) Attain Low-Speed and set cruise control, if possible, to maintain a consistent speed.

6) Start collecting Low-Speed data. Initiating data collection can be done in a variety of different ways. Three such ways are listed below.

a. Automatically use an algorithm wherein device 110 detects the consistent speed of the vehicle and begins collecting data for a predetermined time interval or until the vehicle speed is no longer consistently within the preferred data collection speed parameters.

b. Manually control the data collection via any type of remote control.

c. Automatically control the data collection via an OBD-type reader configured to use vehicle data in order to remotely control the device 110 or devices.

7) Maintain Low-Speed for the prescribed Data Collection Interval.

8) Stop collecting Low-Speed data and store the dataset.

9) Accelerate to High-Speed and set cruise control, if possible, to maintain a consistent speed.

10) Start collecting High-Speed data.

11) Maintain High-Speed for the prescribed Data Collection Interval.

12) Stop collecting High-Speed data and store the dataset.

13) Once the prescribed data has been collected, one or more example methods for processing may be executed:

a. The Low-Speed and High-Speed data can be exported by any means for analysis.

b. The device 110 internally executes the analysis algorithms which are further detailed in this specification and communicates the results by any optical, tethered, wired, or remote control means.

The data can now be used to determine the corrective measures needed. One preferred embodiment of such a process is shown by the flowchart in FIG. 9 in blocks 220, 221, 222, and 223. The steps and outcomes of the flowchart are as follows:

Block 220: Find the best Low-Speed section using the Heuristic. Heuristic refers to an algorithm that chooses a section of data based upon set criteria. These criteria determine the hierarchy of the characteristics considered in the decision-making process. The Heuristic is shown in FIG. 10, continues to FIG. 11, and is concluded in FIG. 12.

Figure 13:
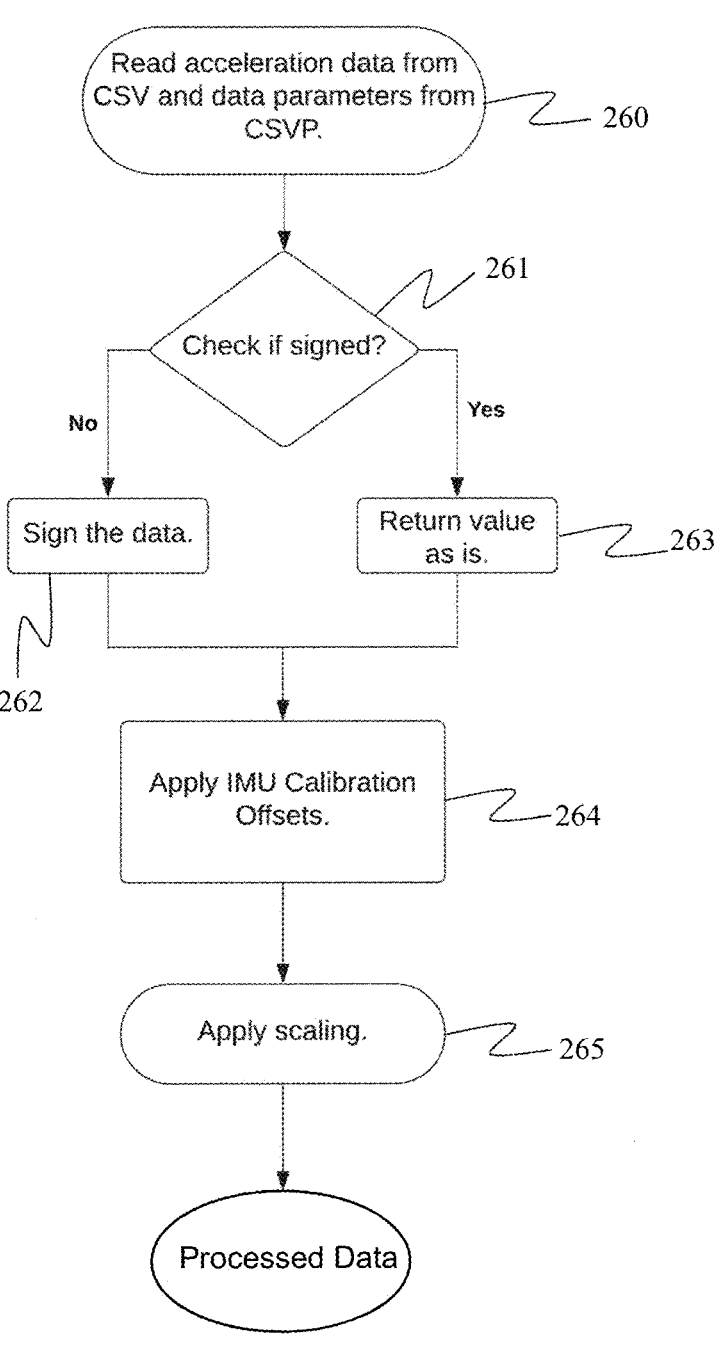
FIG. 13 is a Data Processing flowchart which converts the data received from the module and processes it from an unsigned bitcount to a signed, scaled, and calibrated format.

The first step of the Heuristic is to determine the Heuristic Weights needed to calculate the Heuristic Internal. There can be an unlimited number of Heuristic Weights, but in this example embodiment, only four weights have been selected and are termed the Heuristic Factors. One preferred embodiment for the determination of the Heuristic Factors is shown in FIG. 10. The steps and outcomes of the flowchart are as follows:

Block 230: Get Processed Data. The data must be processed from its raw bitcount format into calibrated, signed, and scaled data. This process is visualized in FIG. 13 in blocks 260, 261, 262, 263, 264, 265, and 266. The steps and outcomes of the flowchart are as follows:

Block 260: Read acceleration data from CSV file and data parameters from CSVP (CSVP refers to a CSV file that contains the data Parameters). The CSV data includes, but is not limited to, acceleration, gyroscopic, and magnetometer data for all three axes (x, y, and z) of each sensor as a bitcount. The bitcount can be 8, 16, 20, 24, or 32 bits in length, depending on the data export and file formats. One preferred embodiment of the present invention primarily makes use of the acceleration data in this disclosure, while the gyroscopic and magnetometer data are used in related functions, data collection, and analysis which include, but are not limited to, lateral runout and alignment. The CSVP data parameters include information such as IMU Calibration Offsets (used for range correction) and sensor sensitivity, which is determined by the maximum possible samples. Preset possible sensitivities include, but are not limited to, +/−2G, +/−4G, +/−8G, and +/−16G, each of which, divided by 65,536 or the maximum bitcount of the IMU used, results in a different corresponding bitcount per G. For instance, a +/−2G range yields a resolution of 16,384 bits per G, while a +/−16G range yields a resolution of 2,048 bits per G.

Blocks 261, 262, and 263: The unsigned data from the CSV files are first converted to signed data.

Block 264: Apply IMU Calibration Offsets. The IMU Calibration Offsets correct the sensor's bitcount range to account for imperfections in the sensor data. This is accomplished by collecting data with the device placed on a level surface so that the sensor is vertically aligned with gravity. In this orientation the sensor will give a reading that corresponds to the value of gravity (1G or 9.8 m/s$^2$). The data is also collected with the sensor vertically aligned opposite gravity. In this orientation the sensor will give a reading that corresponds to the negative value of gravity (−1 G or −9.8 m/s$^2$). If the sensitivity is set at 16G then these two bitcount values would theoretically equal 2048 and −2048 after the unsigned data is converted to signed data. For both electronic and physical reasons those readings can differ from the expected values. The measured readings are referred to as the IMU Calibration Offsets. For example, the value that corresponds to 9.8 m/s$^2$ could be 2050 bitcount and the value that corresponds to −9.8 m/s$^2$ could be −2044 bitcount. It can be seen that the range has increased from its expected value. By subtracting the average of these two values $$\left(\frac{2051 + (-2045)}{2} = 3\right)$$

to the signed data, it will correct the range of the collected and now signed data such that a reading of 2048 bitcount will correspond to 9.8 m/s$^2$ and a reading of −2048 bitcount will correspond to −9.8 m/s$^2$.

Block 265: Apply Scaling. Scaling will stretch or compress the span of the data that exists between 9.8 m/s$^2$ and −9.8 m/s$^2$ so that the data values correspond with the selected sensitivity. For a sensitivity of 16G, the mathematical span between the reading for +9.8 m/s$^2$ and the reading for −9.8 m/s$^2$ should be 4096 bitcount. In an example where the bitcount measurement for +9.8 m/s$^2$ is 2050 and the bitcount measurement for −9.8 m/s$^2$ is −2044, the span would be equal to 4094 bitcount. As the span is not equal to the mathematical span of 16G, that means that the data is compressed and needs to be uncompressed by a factor of $$\frac{4096}{4094} = 1.0004885.$$

Each data point is multiplied by this scaling factor to correct for this compression. Conversely, if the original data was stretched, the scaling factor would be less than one to compress the data. All of the CSV unsigned data has now been signed, the calibrations applied, and the data scaled, if necessary.

Block 266: Processed Data. The outcome after all calculations have been processed.

Block 231: Get the acceleration for each of Sensors in the device.

Figure 14:
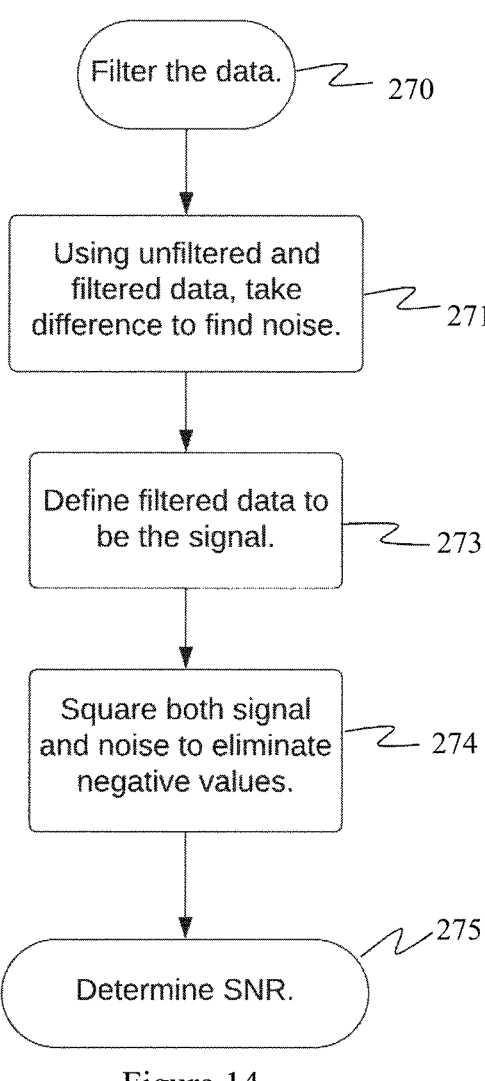
FIG. 14 is a flowchart of the process followed when determining the signal-to-noise ratio (SNR).

Block 233: Calculate the SNR for each dataset. One embodiment of this process is shown in the flowchart in FIG. 14. The steps and outcomes are as follows:

Block 270: Filter the data. A filter, such as a Savitsky-Golay or Gaussian filter, is applied to mitigate or eliminate noise so the RPM is clearer than other vibrations.

Block 271: Using unfiltered and filtered data, take the difference to find noise.

Block 272: Define the filtered data to be the signal.

Block 273: Square both the signal and the noise to eliminate negative values.

Block 274: Determine the SNR. The SNR is the ratio of the squared signal and noise. It is calculated for each sample.

Block 234: Calculate the average of the three sensor SNRs for each sample shown as Output 1 in FIG. 10.

Figure 15:
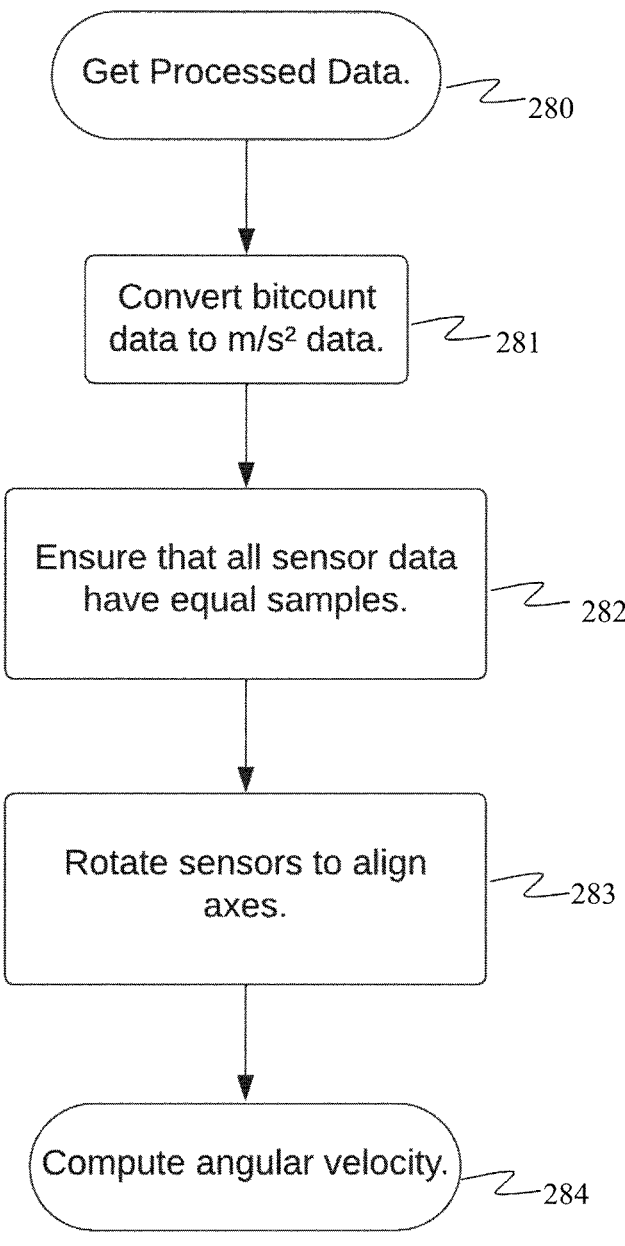
FIG. 15 is a flowchart that demonstrates the process used to derive the angular velocity of the wheel from the sensor data.

Block 235: Derive the angular velocity. The exact angular velocity, or RPM, of the wheel is required to understand the wheel dynamics and vibrations. While there are many ways to collect the angular velocity data of a vehicle in motion, such as taking data from an OBD reader, one preferred embodiment utilizes the multiple IMU data to derive the exact angular velocity of the wheel, as other methods may have inaccuracies. One preferred embodiment for this process is shown in the flowchart in FIG. 15. The steps and outcomes of the flowchart are as follows:

Block 280: Get Processed Data. One preferred embodiment for retrieving Processed Data 266, which is described above, is shown in FIG. 13. The result is calibrated and signed bitcount.

Block 281: Convert bitcount data to m/s$^2$ data. All data is multiplied by a G conversion factor that is determined by the sensitivity setting found in the CSVP data.

Block 282: Ensure that all sensor data have an equal number of samples for each axis. Some methods for ensuring equality would be to resample or truncate the data. The sensor with the lowest number of samples will determine the number of samples for all sensors. The datasets for the other sensors will be corrected to match the lower sample rate. In the preferred embodiment, the sensor sample rates are precisely synchronized, and no extra equalization of the individual axes datasets is necessary.

Figure 16:
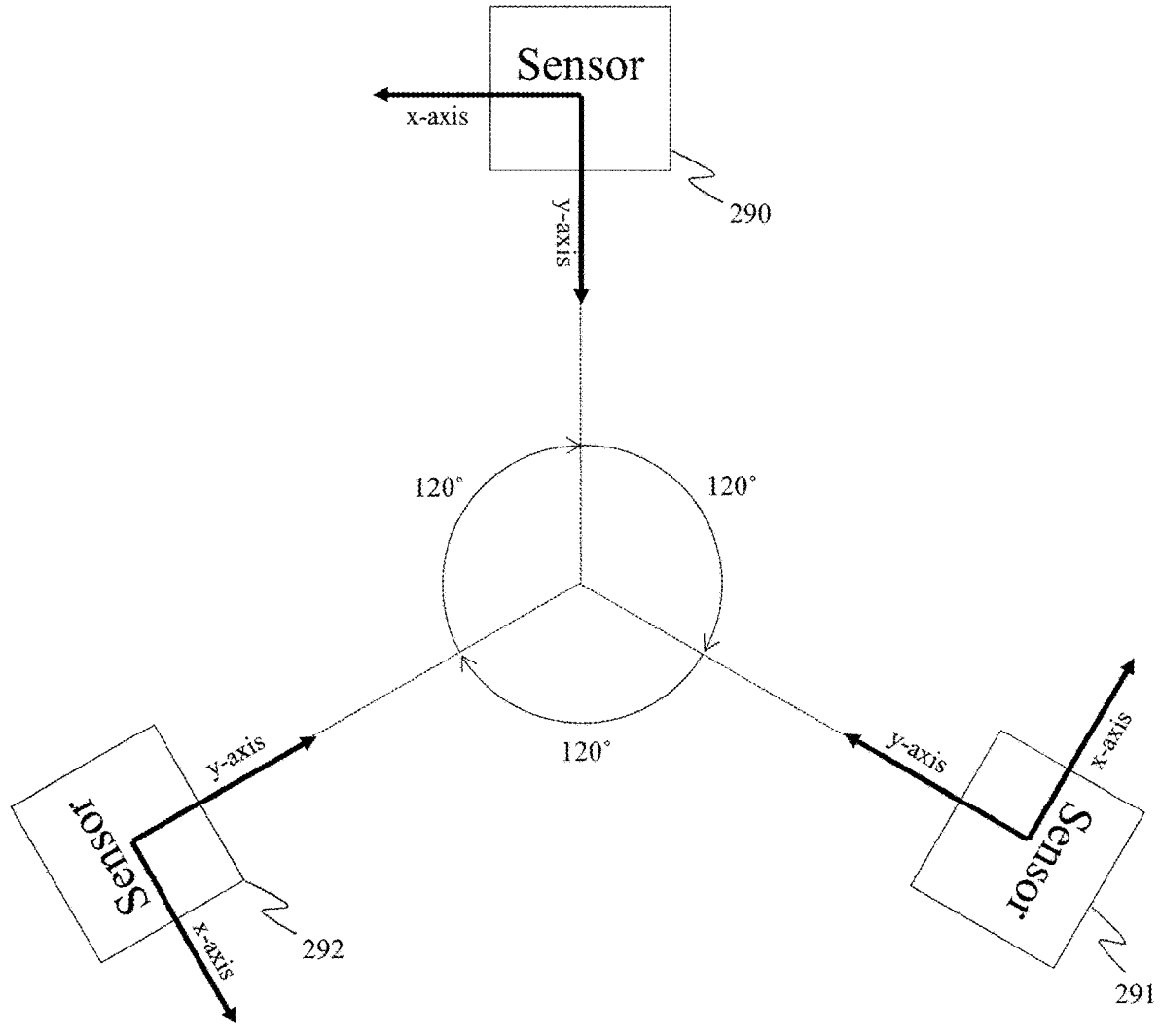
FIG. 16 shows one preferred embodiment's orientation of the axes for each sensor in the on-car device.

Block 283: Rotate sensors to align axes. In one preferred embodiment containing three sensors as shown in FIG. 16, Sensors 290, 291, and 292 represent three IMU's which are oriented on the lugs such that they are precisely equidistant from the center of the module, 120° offset from each other and have their y-axes all pointing toward the center. This is one example possible in a 6 lugs orientation, other lug orientation may not be perfectly equidistant but their degree offset relative to each other would be known based of the lug pattern. The alignment of the axes that is referred to in Block 283 converts the data such that all sensors have the same orientation as Sensor 290, where the y-axis is pointing down and the x-axis is pointing to the left. This alignment is required to compute the angular velocity.

Block 284: Compute the angular velocity. While it is possible to collect angular velocity of the wheel using the OBD and vehicle speed, it is also possible to use the plurality of sensors on the wheel to calculate the angular velocity. Using $$\omega = \sqrt{\frac{x_2 - x_3}{R\sqrt{3}}},$$

the angular velocity is determined in rad/s. This equation was derived from Kionix®, as described in a Kionix paper entitled "Using Two Tri-axis Accelerometers for Rotational Measurements." Jan. 10, 2008 (Document AN 019), 8 pages.

In the angular velocity equation, the following is a listing of what each variable represents:

$\omega$=angular velocity in rad/s $x_2$=x-acceleration of Sensor 291

$x_3$ x-acceleration of Sensor 292

R distance from each sensor to center of the platen

The computed angular velocity is the Derived RPM, shown as Output 2 in FIG. 10.

Block 236: Calculate the RPM SNR for each sample. One embodiment of this process is shown in the flowchart in FIG. 14 and has been described above. This results in a sample-by-sample SNR shown as Output 3 in FIG. 10.

Block 237: Smooth the angular velocity signal. In one preferred embodiment the signal is smoothed using a heavy moving average. With data collected at 2000 samples per second an example of a heavy moving average window would be 2000. The angular velocity can also be used to best determine the value of any applied filter or moving average.

Block 238: Derive the angular acceleration. In one preferred embodiment, the derivative of the angular velocity is used to find the angular acceleration.

Block 239: Square the angular acceleration signal. A constant speed is desired to simplify calculations. Therefore, acceleration is undesirable whether it is positive or negative. Thus, any data that shows an acceleration should be penalized. In order to penalize any and all acceleration, the angular acceleration is squared, which can be used to determine the magnitude of angular acceleration. This determines the Squared Angular Acceleration Heuristic Factor shown as Output 4 in FIG. 10.

At this point the following Heuristic Factors have been determined:

1. The Average Sensor SNR of all sensors associated with each data point is shown as Output 1 in FIG. 10.
2. The RPM associated with each data point is shown as Output 2 in FIG. 10.
3. The RPM SNR associated with each data point is shown as Output 3 in FIG. 10.
4. The Squared Angular Acceleration associated with each data point which is shown as Output 4 in FIG. 10.

Figure 11:
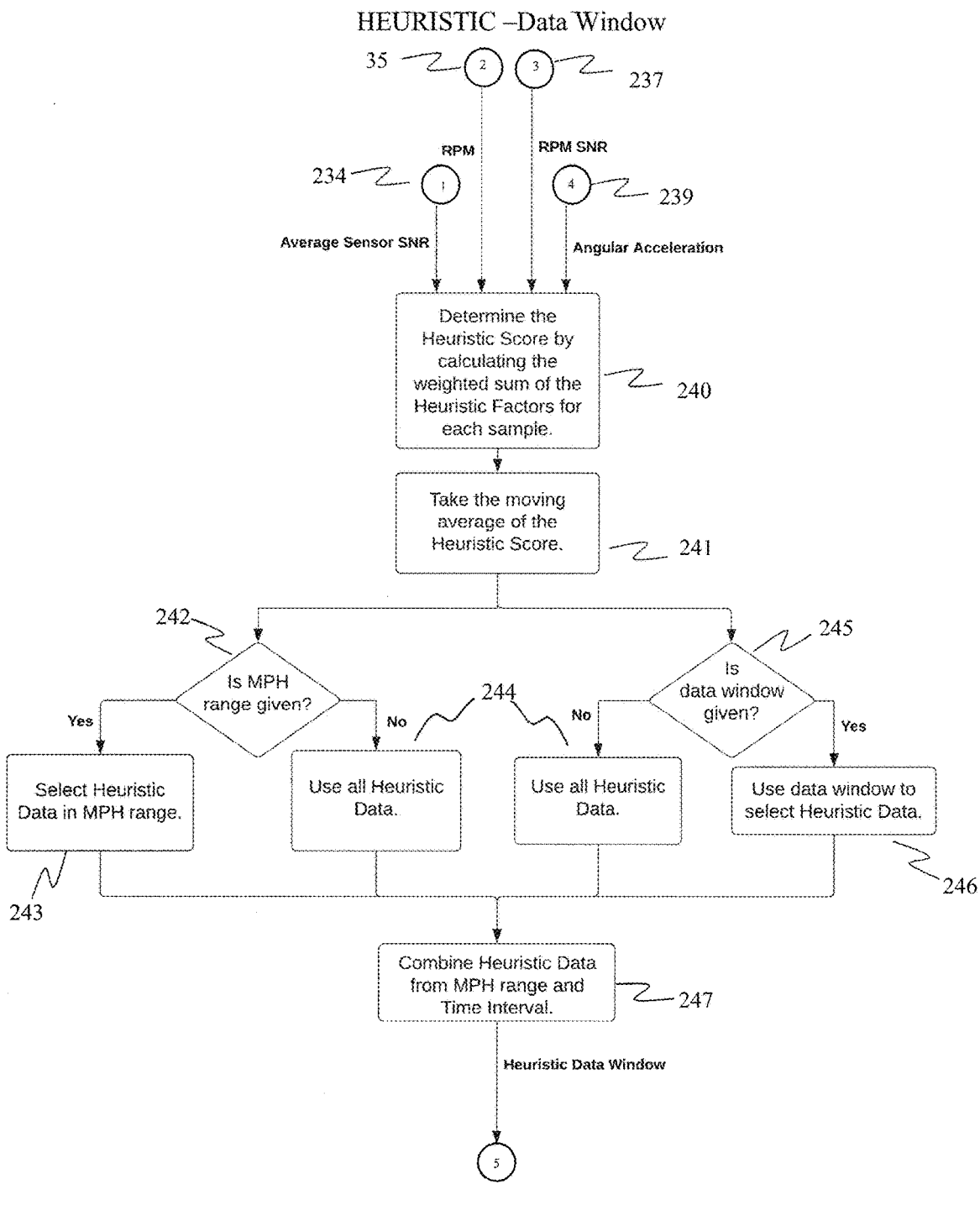
FIG. 11 is the second section of the Heuristic Flowchart, continued from FIG. 10. This shows the process followed in determining the Heuristic Score and Heuristic Data Window of each section of data.

Using the Heuristic Factors in the above list, the Heuristic Data Window can now be calculated. One embodiment of this process is shown in the flowchart of FIG. 11. The steps and outcomes of this flowchart are as follows:

Block 240: Compute the weighted sum of the Heuristic Factors for each sample. This weighted sum will be referred to as the Heuristic Score. The Heuristic Score is used to determine the section of the data that will be used in the analysis, the Heuristic Interval. An example of possible factors and their weights are as follows:

Average Sensor SNR 10

Angular Velocity 0

RPM SNR 0

Angular Acceleration −30

The weight for the Angular Acceleration is negative to decrease the score of any data that has any acceleration.

An example of determining a Heuristic Score would be a data point with an SNR of 5 and an angular acceleration of 1, which would have a total score of:

$$5*10+1*(-30)=20 \text{ (Heuristic Score)}$$

The Heuristic Score is calculated for each data point in the signal.

Block 241: Take the moving average of the Heuristic Scores. The window size of the moving average is determined before analysis. This averaged Heuristic Score is called the Heuristic Data.

Block 242: Is MPH range given? In one preferred embodiment the MPH range will be entered as a preset based upon information provided as to what speed a quality-of-the-ride issue has been detected.

If "yes" to Block 242, then:

Block 243: Select Heuristic Data in the MPH range. The velocity of the vehicle at each data point can be determined. The Heuristic Data for all data points with a velocity that lies within the preset or predetermined MPH range will be analyzed. This will eliminate any data that was collected when the vehicle was not at the preset or predetermined speed.

If "no" to Block 242, then:

Block 244: Use all Heuristic Data.

Block 245: Is data window given? The data window refers to a Time Interval. The Time Interval refers to a specific start and end time relative to the entire data set. The Time Interval limits the selection of Heuristic Data to be used, thereby allowing the user to isolate desired section of the data. For example, if a pothole was hit during the data collection at a known time, say 10 seconds into the collection, then a Time Interval may be given starting at 15 seconds and ending at 30 seconds to eliminate known artifacts not resulting from vehicular vibrations.

If "yes" to Block 245, then:

Block 246: Use the data window to select Heuristic Data.

If "no" to Block 245, then:

Block 244: Use all Heuristic Data.

Block 247: Combine Heuristic Data from MPH range and Time Interval. The outcomes of both the MPH Range from Block 242 and the Time Interval from Block 245 are combined to create what is herein termed the Heuristic Data Window.

Figure 12:
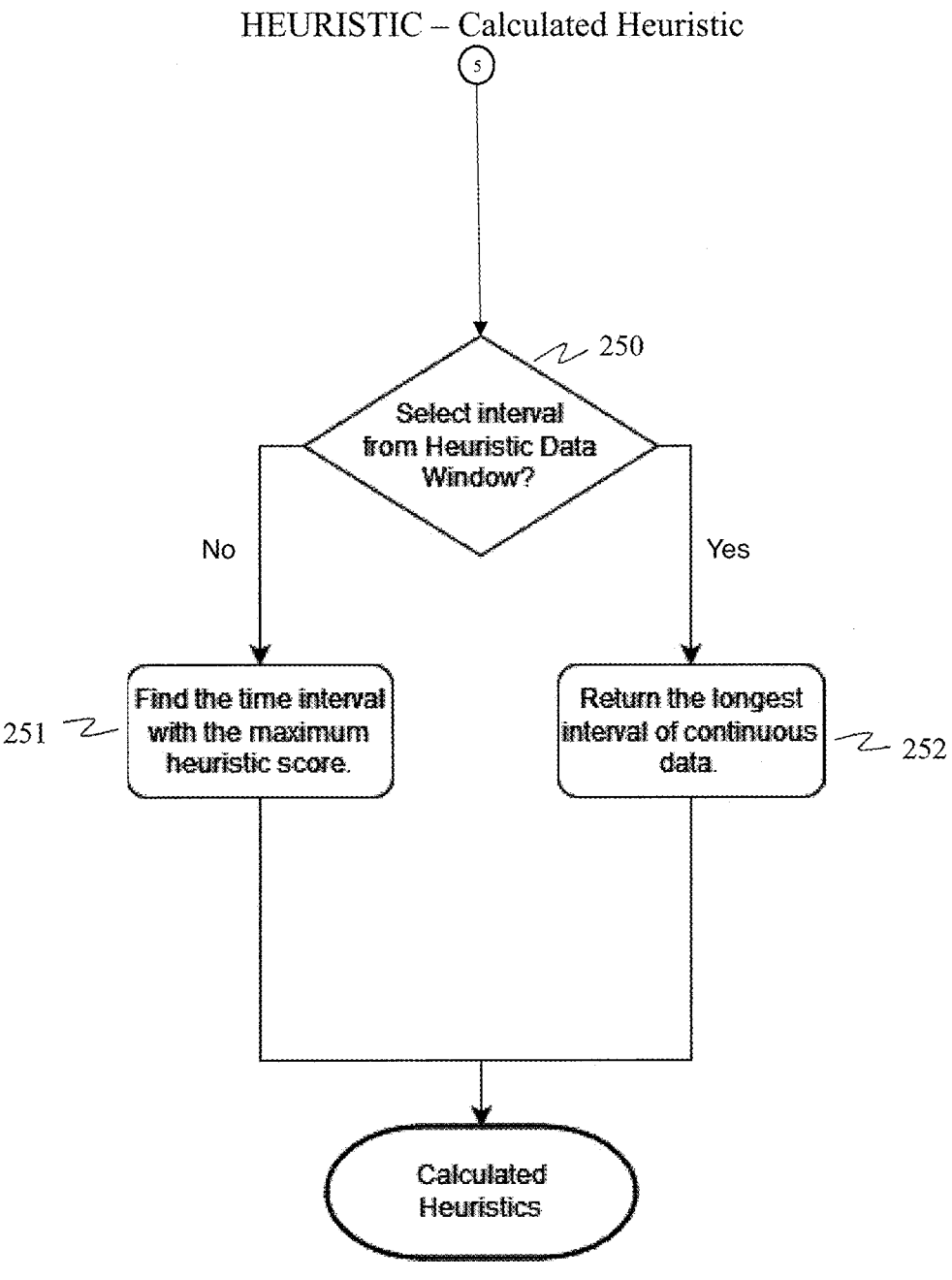
FIG. 12 is the third section of the Heuristic flowchart, continued from FIG. 11. This shows the process followed in selecting the interval which has the highest heuristic score.

Now that the Heuristic Data Window that is to be used is known, the Heuristic Interval can be selected. One embodiment for this process is shown in the flowchart of FIG. 12. The steps and outcomes are as follows:

Block 250: Select interval from Heuristic Data Window? If "no" to Block 250, then:

Block 251: Find the time interval with the maximum Heuristic Score. The maximum Heuristic Interval is determined by the moving average found in Block 241.

If "yes" to Block 250, then:

Block 252: Return the longest interval of continuous data. In order get the best analysis, only a certain number of consecutive outliers—for example data points with acceleration above a threshold—are allowed before the interval can be considered for analysis.

Figure 9:
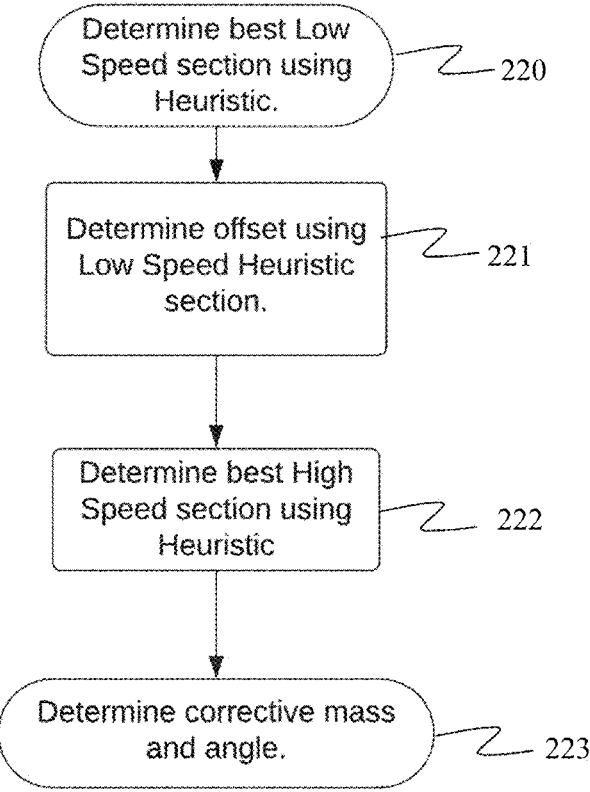
FIG. 9 is a flowchart of a simplistic Overview of the method used to determine the corrective mass and corrective angle.

With the selected interval from Block 251 or Block 252, the Heuristic has been used to calculate and determine the best Low-Speed in Block 220 of FIG. 9.

FIG. 9 Block 221 Example Method: Determine offset using Low-Speed Heuristic section. The offset is the difference between the tire/wheel bearing center and the derived center of the three Axes of the IMU's. The Low-Speed is used because most tire and wheel anomalies that occur at high speeds are not apparent at lower speeds. Once the device offset has been determined, any measured off-center deviation of the rotational High-Speed data can be used to identify an imbalance, radial force variation, or eccentricity or other type of problem.

Figure 17:
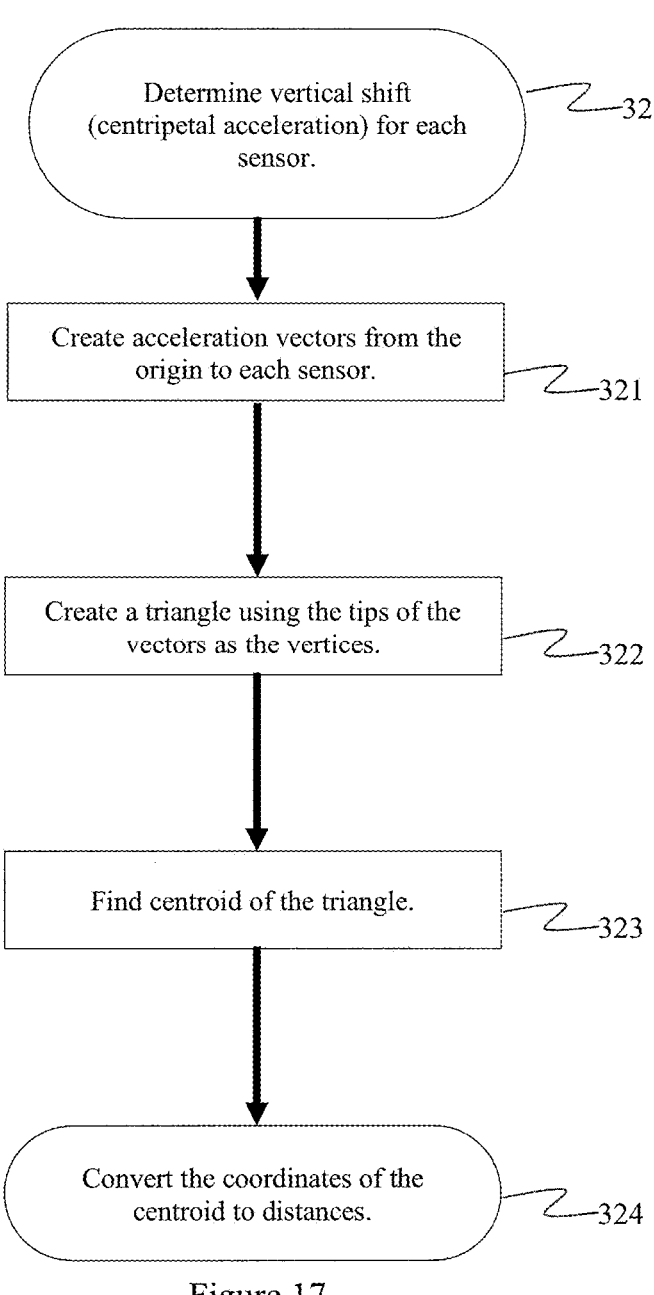
FIG. 17 is a flowchart of the process followed (Triangle Method) for determining the coordinates of the imbalance mass.
Figure 18:
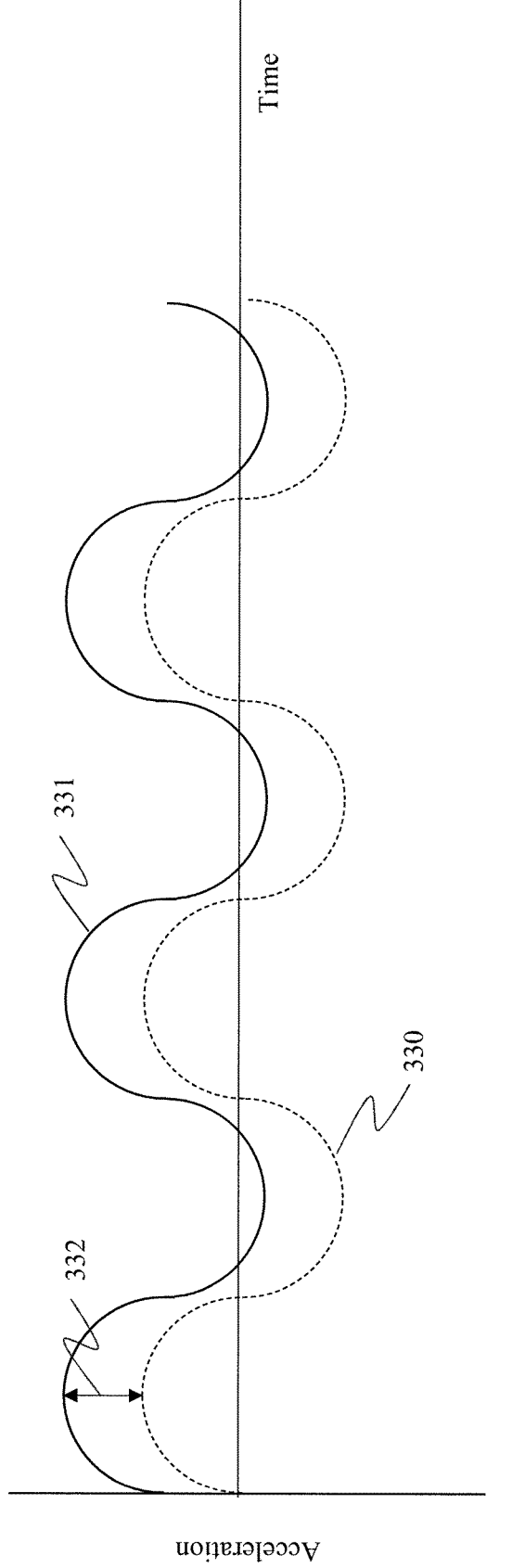
FIG. 18 is an example of how the signal collected by an IMU is shifted in the positive direction due to its centripetal acceleration when it is attached to a wheel assembly in motion.

One preferred embodiment in the process for determining the offset is termed herein as the "Triangle Method." The Triangle Method is represented in the flowchart of FIG. 17. The steps and outcomes of the flowchart are as follows:

Block 320: Determine the vertical shift (centripetal acceleration) for each sensor. The term "vertical shift" refers to a movement of the signal in the positive y-direction. In FIG. 18 the dotted line 330 represents the original sinusoidal signal which is created by gravity and a rotating sensor when the sensor is located precisely in the center of the axis of rotation. When the sensor is not precisely in the center of the axis of rotation, it moves in a circular path and experiences an additional centripetal acceleration which causes the signal to shift in the positive direction by an amount equal to the centripetal acceleration. The solid line 331 in FIG. 18 represents this shifted signal. The vertical shift is represented by 332. The vertical shift in the signal is caused by the centripetal acceleration of the sensor. The vertical shift is determined by taking the average of the entire time span that is being evaluated.

Figures 19A, 19B:
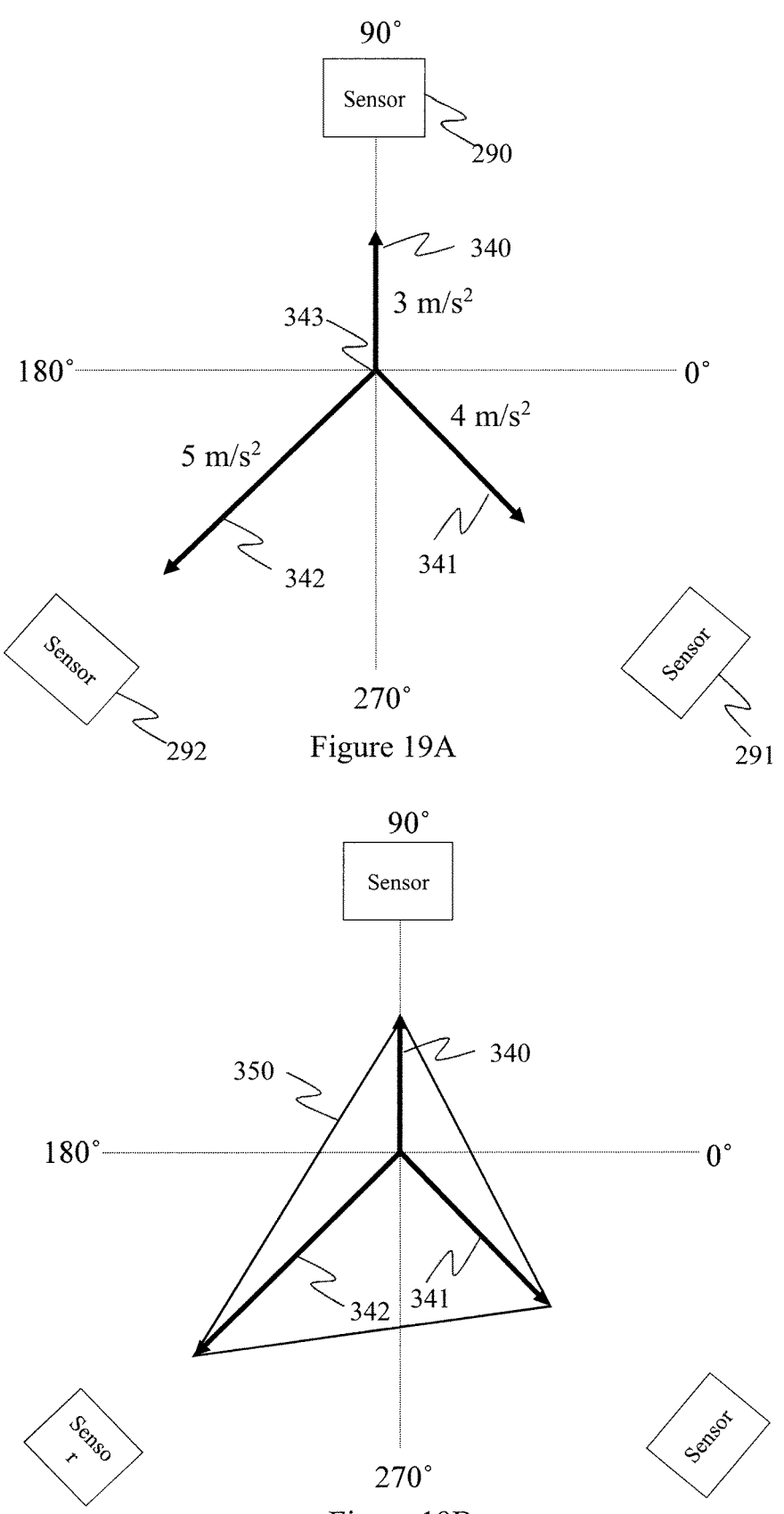
FIG. 19A is an example of how the acceleration vectors derived from the data are aligned using the Triangle Method.
FIG. 19B shows the triangle that is drawn from the acceleration vectors.

Block 321: Create the acceleration vectors from the origin to each sensor. This process is shown in FIG. 19A. Align a vector from the origin 343 toward each sensor with a magnitude that is equal to the magnitude of the vertical shift of that sensor. An example where the centripetal acceleration of Sensor 290 is 3 m/s², shown as vector 340, Sensor 291 is 4 m/s², shown as vector 341, and Sensor 292 is 5 m/s², shown as vector 342, is shown in FIG. 19A.

Block 322: Create a triangle using the tips of the vectors as the vertices. An example of this is shown in FIG. 19B with the derived triangle shown as 350.

Figure 20A:
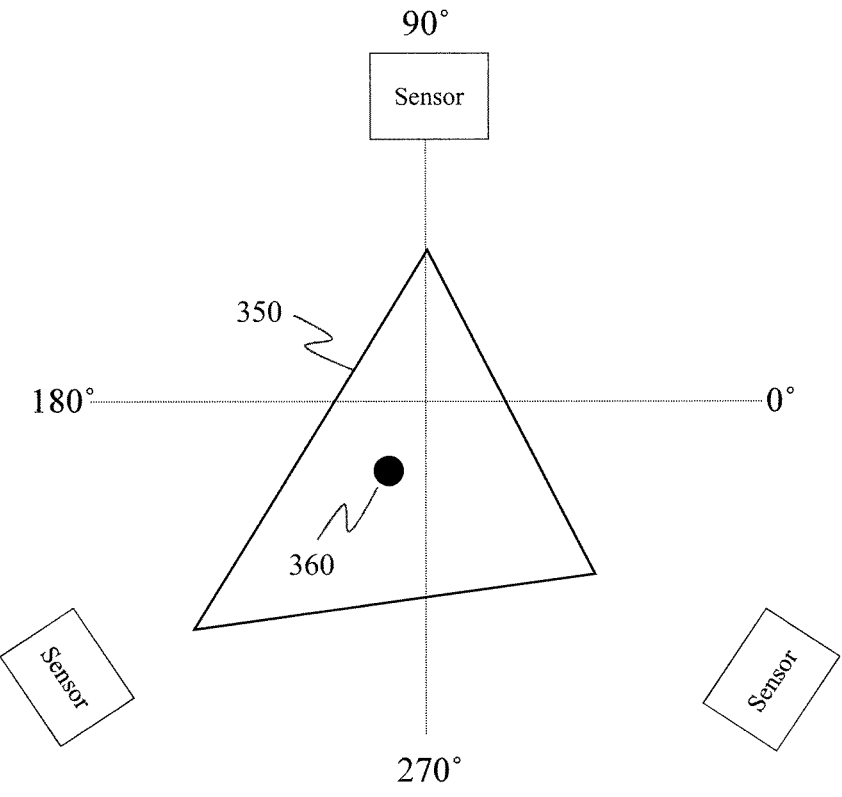
FIG. 20A shows the derived centroid of a triangle from the sensor data.

Block 323: Find the centroid of the triangle. This is done by taking the average of the coordinates for vertices 340, 341, and 342 of the triangle 350 in FIG. 19B. The centroid 360 is shown in FIG. 20A.

Block 324: Convert the coordinates of the centroid to distances. These coordinates are derived using acceleration vectors and therefore have acceleration values. Using the equation $a_c=\omega^2 r$, these values can be converted into distances using the average acceleration. The average angular velocity is determined by taking the average of the angular velocity 284 over the selected MPH range.

The above calculation is completed using data from the x-axis sensor and from the y-axis sensor. Each calculation produces a point identified by a coordinate pair. The coordinates found are offset and determine the location of the bearing center. The offset can be used for calibration in a High-Speed section. While the Low-Speed section is used to determine the offset, and thus calibrate and align the device to the wheel/hub assembly, the High-Speed section is used to determine the location and magnitude of vibrational anomalies in the wheel assembly.

FIG. 9. Block 222 Example Method: Find the best High-Speed section using the Heuristic. Follow the same steps that were used on the Low-Speed section from Blocks 230 to 239 in FIG. 10 and Blocks 240 to 247 in FIG. 11. Specific to the High-Speed section and due to the increased vibrations present at higher speeds, a time interval of data can be used to optimize results. Block 245 is a "yes", so the desired time interval is applied over the Heuristic Data from the High-Speed section to determine the Heuristic Interval which will be used in the following steps.

Figure 20B:
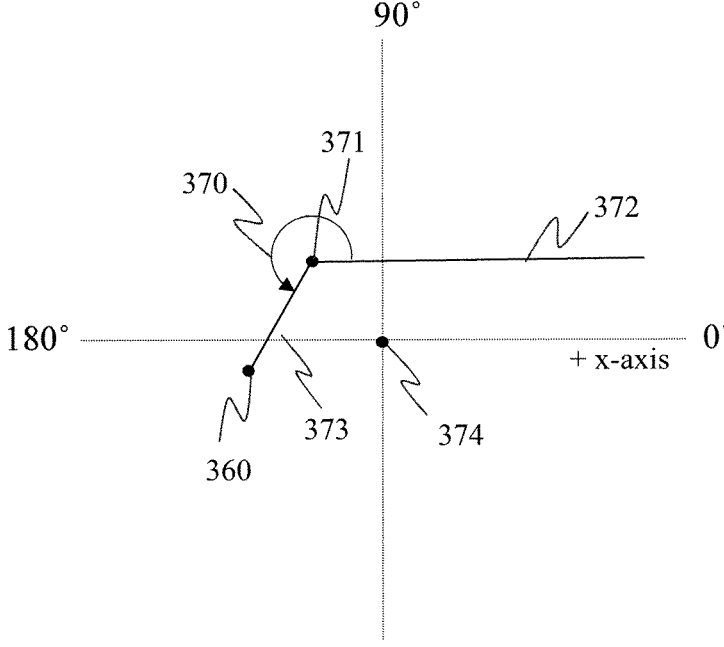
FIG. 20B shows how the corrective angle is derived.

Block 223: Determine the corrective mass and angle. The corrective angle is determined by applying the Triangle Method, described above, on the data from the interval determined from the Heuristic applied to the High-Speed Block 247. This application of the Triangle Method determines the coordinates of the centroid 360, the anomaly-altered center of mass of the tire/wheel assembly, of triangle 350 in FIG. 20A. The angular location of centroid 160 relative to the offset 371 in FIG. 20B, determined from the Low-Speed section, is used to determine the angular position of the corrective mass. Angle 370 in FIG. 20B is measured from line 372, which is parallel to the x-axis of the device and passes through the offset 371 to a vector 373 which goes from the offset 371 to the centroid 360. This angle is the angle from the bearing center to the vibrational anomaly. The corrective angle is opposite angle 370.

One embodiment for determining the magnitude of the corrective mass is done by a predictive model. In one example, the predictive model is an order regression (e.g., a second order regression) which is shown in the flowchart in FIG. 21. Stated another way, FIG. 21 shows a process wherein acceleration data is applied to a predictive model (here, an order regression) to determine the magnitude of the mass. The scope of the present method is not limited to using order regression, but includes other types of predictive models, such as classification models or neural networks.

The steps and outcomes are as follows:

Block 380: Get Processed Data. One preferred embodiment for retrieving Processed Data 266, which is described above, is shown in FIG. 13.

Block 381: Select section for analysis. This section is typically the section of data where there is a desired comfort of ride issue or section of data with vibrational anomaly to analyze.

Block 382: Derive the angular velocity. One method is described previously and is shown in FIG. 15.

Block 383: Integrate the angular velocity to get the tire angle for each sample.

Block 384: Interpolate the acceleration data such that it is evenly spaced out per tire angle.

Block 385: Reduce Spectral Leakage. One preferred embodiment uses resampling methods.

Block 386: Calculate the Fast Fourier Transform.

Block 387: Convert frequencies to orders. This gives the order amplitude.

Block 388: Record the order amplitude for that sensor. Repeat Blocks 380 through 388 for the rest of the sensors.

Block 389: Compute the average of one order's amplitude for all sensors.

Block 390: Determine the corrective mass using the average order amplitude and a mass regression curve. The mass regression is a relationship between those factors that are most influential toward the vibration of the wheel assembly. Those factors may include tire mass, rim radius, weight over the axle, and other factors.

The mass regression provides the corrective mass from Block 390 and, with the location of the corrective mass, opposite angle 370, provides the solution for which corrective mass to apply and in what angular location, relative to the center of the device or wheel assembly, to correct for wheel/hub assembly vibrations.

Another preferred embodiment is the unitization of a body mounting mechanism which allows for the device to be mounted on other components of the vehicle. This mounting device is shown in FIG. 22 where the device with the body mounting mechanism 400 is comprised of the device 100 and the body mounting mechanism 401 which includes the attaching magnet 402 and the body mounting face 403. One preferred method of attaching the device is through an adhesive strip (adhesive), placed on the mounting face 403, allowing attachment to the vehicle. Other methods of removably attaching the device to the car are within the scope of the invention, such as zip ties, hook-and-loop fastener (e.g., VELCRO®), and magnets. Attachment methods such as adhesive and VELCRO are particularly suitable for mounting onto non-ferrous (non-magnetically receptive) components of the vehicle or the vehicle body. The inclusion of a body mounting mechanism allows for the device to be placed on any component of the vehicle for localized vibration measurement, such as engine vibration and drive train vibrations. FIG. 23 shows multiple devices on a vehicle 410 which include a body device 400 attached to the hood and three lug devices 110 attached to a wheel of the same vehicle.

For clarity, the present disclosure refers to multiple, different embodiments of a "mounting mechanism," one being a lug embodiment for attachment to an individual lug nut of a tire/wheel assembly and shown in FIG. 2A and FIG. 23 as the lug devices 110 which includes the lug attachment 111, and another one being a vehicle body embodiment for attachment to a part of the vehicle body and shown in FIG. 22 and FIG. 23 as the body device 400.

Figure 24:
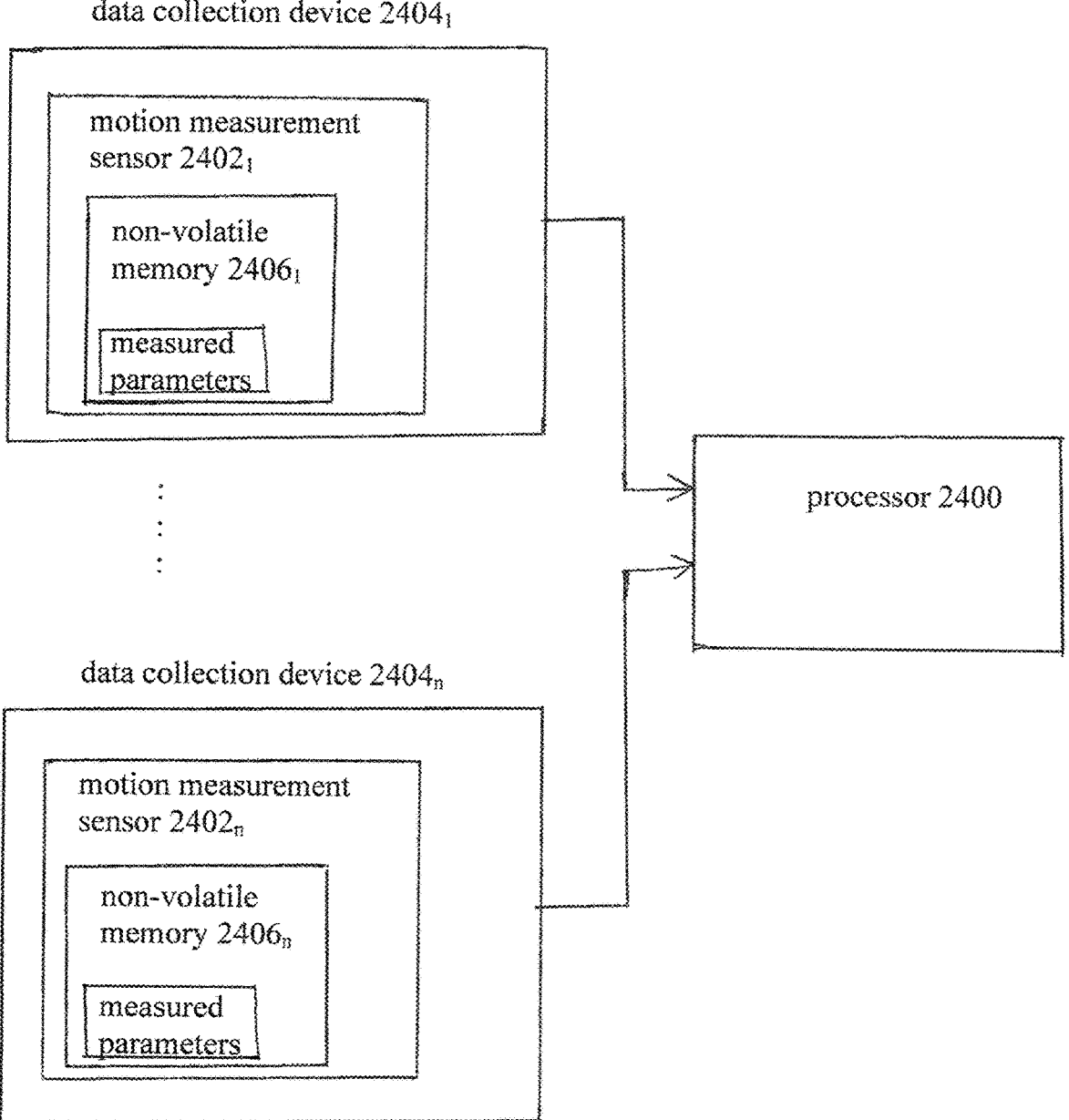
FIG. 24 is a schematic diagram of processor-related elements for determining imbalance forces of a wheel assembly of a vehicle during motion of the vehicle in accordance with one preferred embodiment of the present invention.

FIG. 24 shows a schematic diagram of system components for determining imbalance forces of a wheel assembly of a vehicle during motion of the vehicle. As discussed above, in one preferred embodiment, a motion measurement sensor (e.g., IMU) of a data collection device measures parameters that are used for calculating imbalance forces during motion of a vehicle.

Referring to FIG. 24, processor 2400 is configured to electronically receive measured parameters from motion measurement sensors $2402_1$-$2402_n$ of each of a plurality of data collection devices $2404_1$-$2404_n$. In one preferred embodiment, there are at least three data collection devices 2404. The processor 2400 uses the measured parameters to identify an instantaneous center of rotation of the wheel assembly for use in determining imbalance forces of the wheel assembly of the vehicle during motion of the vehicle, as described in the flowcharts above.

In one preferred embodiment, each of the motion measurement sensors $2402_1$-$2402_n$ includes non-volatile memory $2406_1$-$2406_n$ configured to provide on-board storage of the measured parameters, and the processor 2400 is further configured to receive the measured parameters by offloading the measured parameters from the non-volatile memory 2406 of the respective motion measurement sensor 2402.

It will be appreciated by those skilled in the art that changes could be made to the embodiments described above without departing from the broad inventive concept thereof. It is understood, therefore, that this invention is not limited to the embodiments disclosed, but it is intended to cover modifications within the spirit and scope of the present invention.

What is claimed is:

1. An apparatus configured to be removably attached to a lug nut of a wheel of a vehicle, the apparatus comprising a data collection device that is removably attachable to the lug nut, the data collection device including:

(a) an enclosure including a motion measurement sensor housed therein configured to measure parameters that are used for calculating vibrational anomalies of the vehicle; and (b) a mounting mechanism that is removably attached to the enclosure including the motion measurement sensor housed therein, the mounting mechanism having a proximal end and a distal end, the proximal end of the mounting mechanism having a fixative for removably attaching the mounting mechanism to the enclosure including the motion measurement sensor housed therein, wherein the fixative is immobile with respect to the enclosure immediately upon attachment to the enclosure including the motion measurement sensor housed therein, the fixative thereby not requiring further movement with respect to the enclosure including the motion measurement sensor housed therein immediately upon attachment to the enclosure including the motion measurement sensor housed therein, and the distal end of the mounting mechanism being a vehicle mounting interface configured to allow the data collection device to be removably attached to the lug nut, and wherein a longitudinal axis of the enclosure and a longitudinal axis of the mounting mechanism are both configured to be coincident with a longitudinal axis of the lug nut when the apparatus is removably attached to the lug nut.

2. The apparatus of claim 1 wherein the vehicle mounting interface of the mounting mechanism is a cup-shaped object that allows the data collection device to be removably attached to the lug nut, the cup-shaped object being hollow along at least a portion of its length, the hollow portion having a diameter that is larger than a diameter of the lug nut so as to allow the data collection object to be mounted to the wheel of the vehicle by fitting the cup-shaped object over the lug nut.

3. The apparatus of claim 2 wherein the cup-shaped object has a shape that matches the lug nut so as to prohibit rotation of the apparatus with respect to the lug nut.

4. The apparatus of claim 1 wherein the fixative is a magnet.

5. The apparatus of claim 1 wherein the motion measurement sensor is an inertial measurement unit (IMU).

\* \* \* \* \*